(12) United States Patent
Hoffmann et al.

(10) Patent No.: US 11,559,039 B2
(45) Date of Patent: Jan. 24, 2023

(54) PORTABLE PET GROOMING SYSTEM

(71) Applicant: BISSELL INC., Grand Rapids, MI (US)

(72) Inventors: Jeremy W. Hoffmann, Comstock Park, MI (US); Brian Robert Dexter, Grand Rapids, MI (US)

(73) Assignee: BISSELL Inc., Grand Rapids, MI (US)

( * ) Notice: Subject to any disclaimer, the term of this patent is extended or adjusted under 35 U.S.C. 154(b) by 354 days.

(21) Appl. No.: 16/990,171

(22) Filed: Aug. 11, 2020

(65) Prior Publication Data

US 2021/0051921 A1 Feb. 25, 2021

Related U.S. Application Data

(60) Provisional application No. 62/890,165, filed on Aug. 22, 2019.

(51) Int. Cl.
*A01K 13/00* (2006.01)
*A47L 7/00* (2006.01)

(52) U.S. Cl.
CPC .......... *A01K 13/001* (2013.01); *A47L 7/0009* (2013.01)

(58) Field of Classification Search
CPC . A01K 13/001; A47L 7/0009; A47L 11/4016; A47L 11/4022; A47L 11/4083; A61D 7/00; A61D 11/00
See application file for complete search history.

(56) References Cited

U.S. PATENT DOCUMENTS

| | | | | |
|---|---|---|---|---|
| 5,095,853 A | * | 3/1992 | Kruger | A01K 13/002 119/606 |
| 5,211,131 A | * | 5/1993 | Pylyer | A01K 13/002 15/352 |
| 5,768,748 A | * | 6/1998 | Silvera | A01K 13/001 119/664 |
| 6,167,586 B1 | | 1/2001 | Reed, Jr. et al. | |
| 6,345,592 B1 | * | 2/2002 | Hollis | A01K 13/00 119/604 |
| 6,453,848 B1 | * | 9/2002 | Hachey | A01K 13/001 119/602 |
| 7,073,226 B1 | | 7/2006 | Lenkiewicz et al. | |
| 7,578,025 B2 | * | 8/2009 | Kostreba | A47L 11/4088 315/320 |
| 8,205,296 B1 | * | 6/2012 | Bissell | A47L 9/04 15/421 |

(Continued)

FOREIGN PATENT DOCUMENTS

GB 2291790 A * 2/1996 ............. A47L 11/34

*Primary Examiner* — Ebony E Evans

(74) *Attorney, Agent, or Firm* — Warner Norcross + Judd LLP

(57) ABSTRACT

The present disclosure provides a pet grooming system and various related apparatus for grooming a pet. The pet grooming system can comprise components dedicated to pet grooming or can adapt a surface cleaning apparatus or tools normally used for cleaning floors and upholstery to instead groom a pet. The pet grooming system can include a hand tool coupled with a portable module via a conduit assembly, at least a portion of which may be in the form of a flexible hose. A plurality of pet grooming attachments are provided, and the hand tool can concurrently mount a grooming comb and a sprayer attachment to groom a pet.

20 Claims, 25 Drawing Sheets

(56) References Cited

U.S. PATENT DOCUMENTS

| | | | | |
|---|---|---|---|---|
| 8,555,463 B1 * | 10/2013 | Laube | .................... | A47L 7/009 |
| | | | | 119/606 |
| 8,991,000 B2 | 3/2015 | Huffman et al. | | |
| 9,220,237 B1 * | 12/2015 | Dryden | ................ | A01K 13/002 |
| 9,615,703 B2 | 4/2017 | Moyher, Jr. et al. | | |
| 10,098,322 B2 * | 10/2018 | Ferrentino | ............. | B26B 19/44 |
| 10,905,101 B2 * | 2/2021 | Mainini | ............... | A01K 13/001 |
| 11,083,170 B2 * | 8/2021 | Moyher, Jr. | ......... | A01K 13/001 |
| 2010/0294208 A1 * | 11/2010 | Dyson | .................. | A47L 9/0653 |
| | | | | 15/415.1 |
| 2013/0145576 A1 * | 6/2013 | Hollis | ...................... | A47L 9/06 |
| | | | | 15/368 |
| 2014/0201940 A1 * | 7/2014 | Moyher, Jr. | ........ | A47L 11/4002 |
| | | | | 15/321 |
| 2017/0071156 A1 * | 3/2017 | Cafasso | ................... | B25G 3/12 |
| 2017/0071434 A1 | 3/2017 | Nguyen et al. | | |
| 2017/0127900 A1 * | 5/2017 | Wright | ................ | A47L 11/4016 |
| 2017/0265431 A1 * | 9/2017 | Urso | ..................... | B25G 1/102 |
| 2018/0103611 A1 | 4/2018 | Mainini et al. | | |
| 2018/0110201 A1 | 4/2018 | Mohyer, Jr. et al. | | |

* cited by examiner

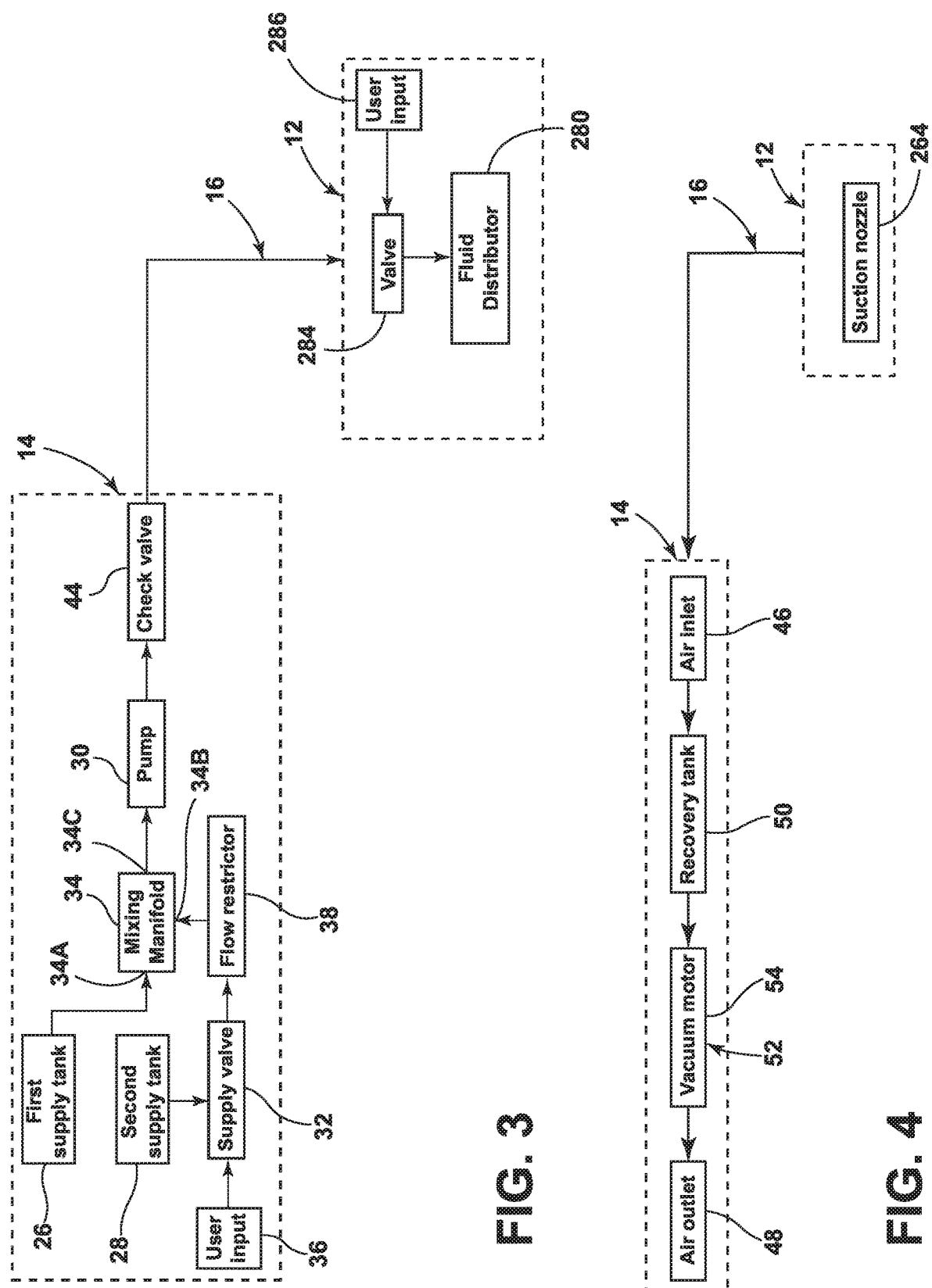

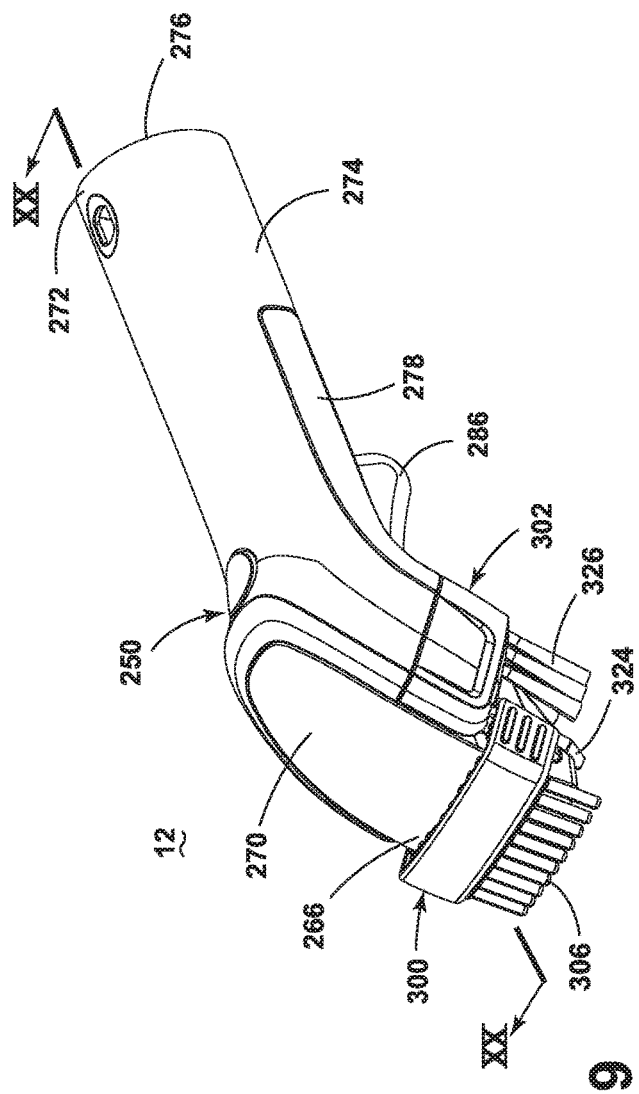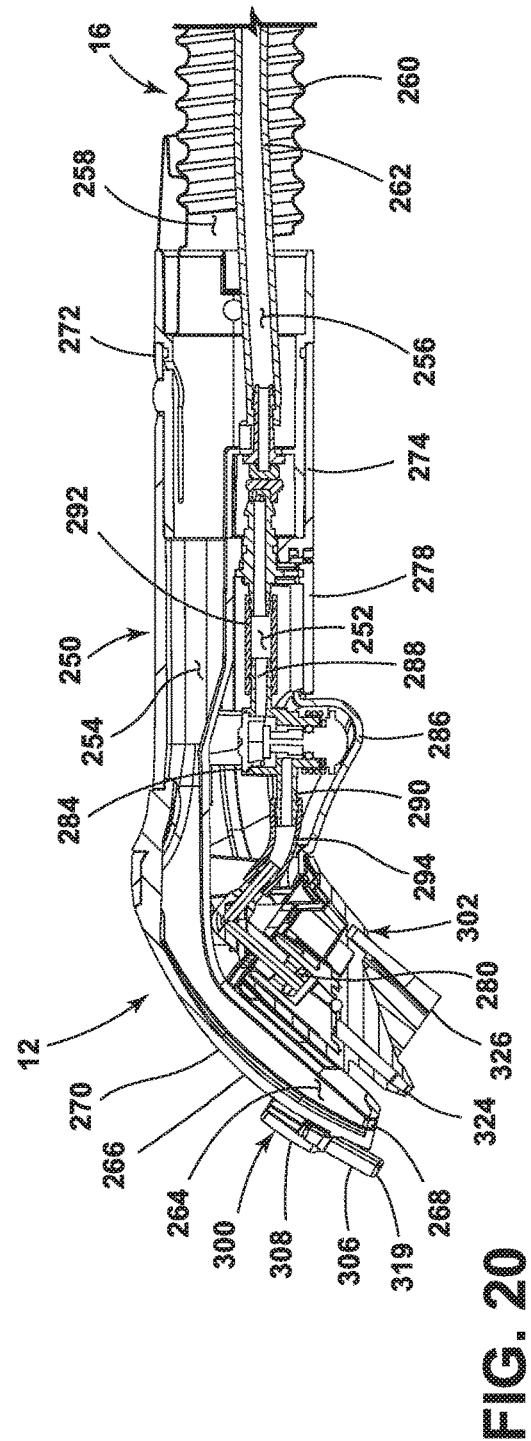
FIG. 19
FIG. 20

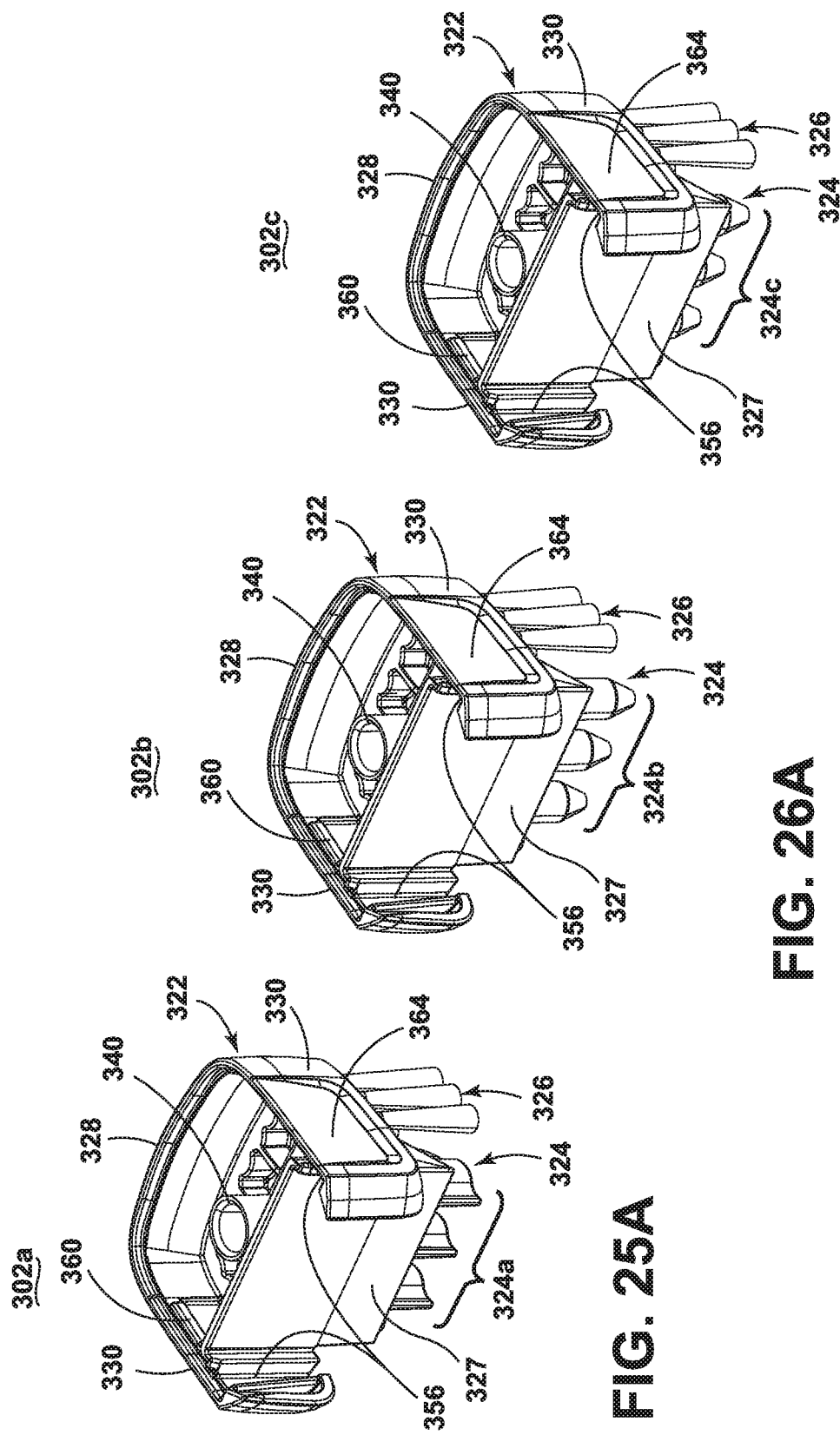

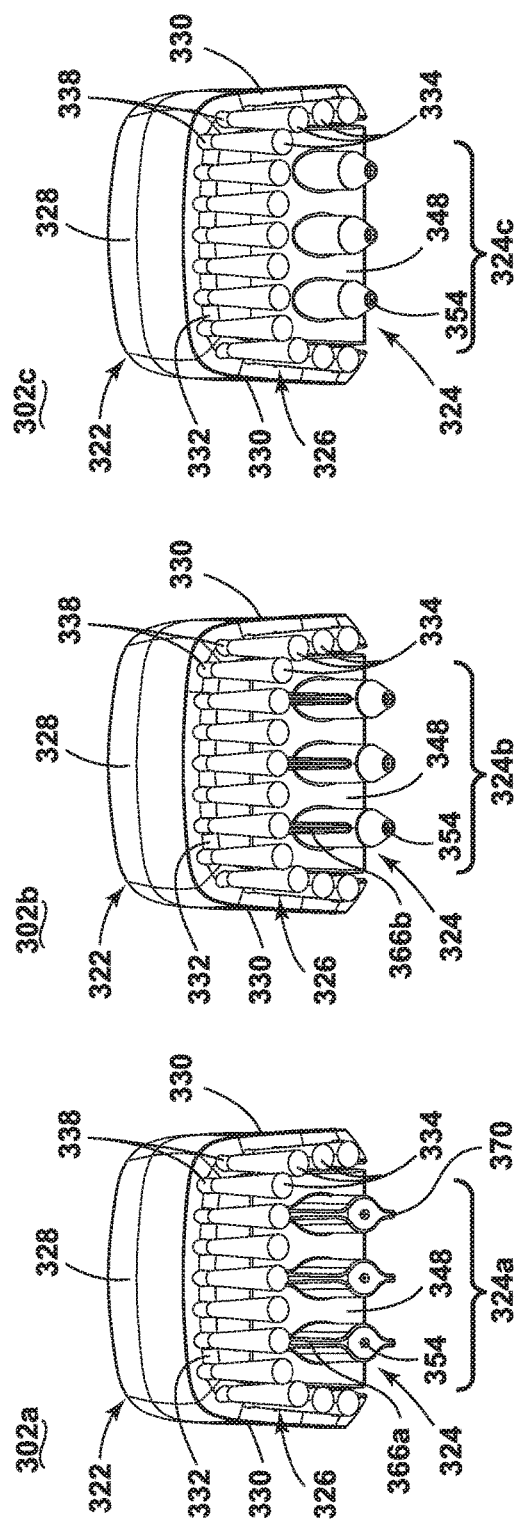
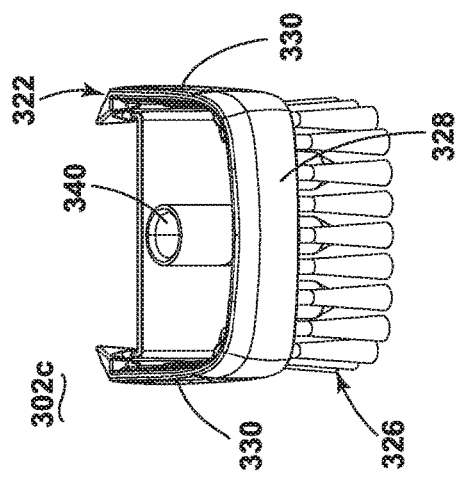
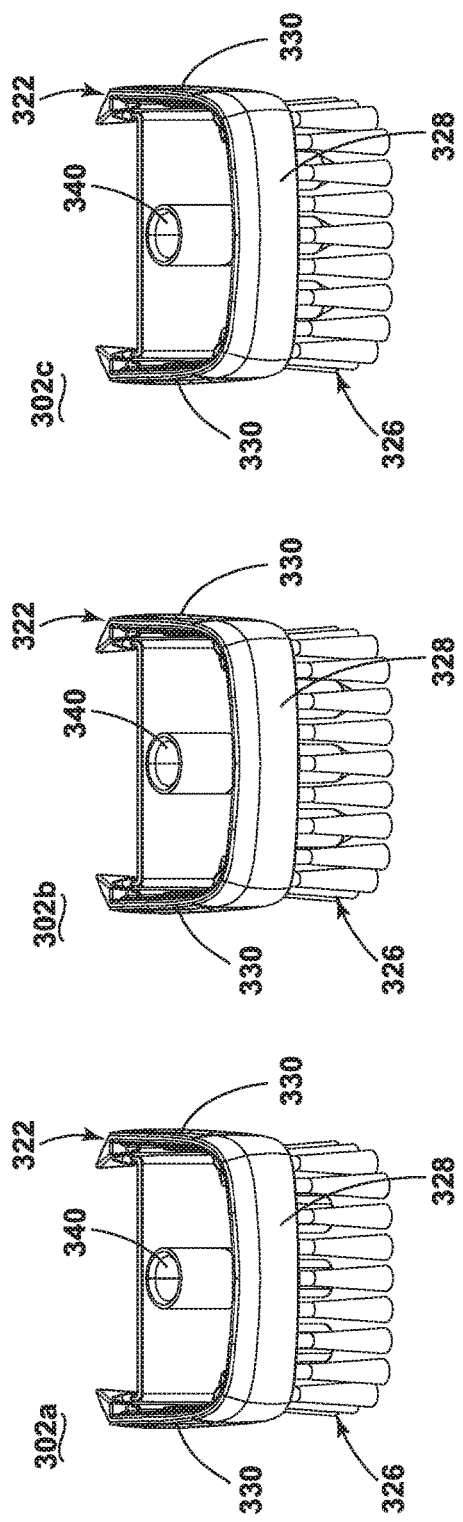
FIG. 25B  FIG. 26B  FIG. 27B
FIG. 25C  FIG. 26C  FIG. 27C

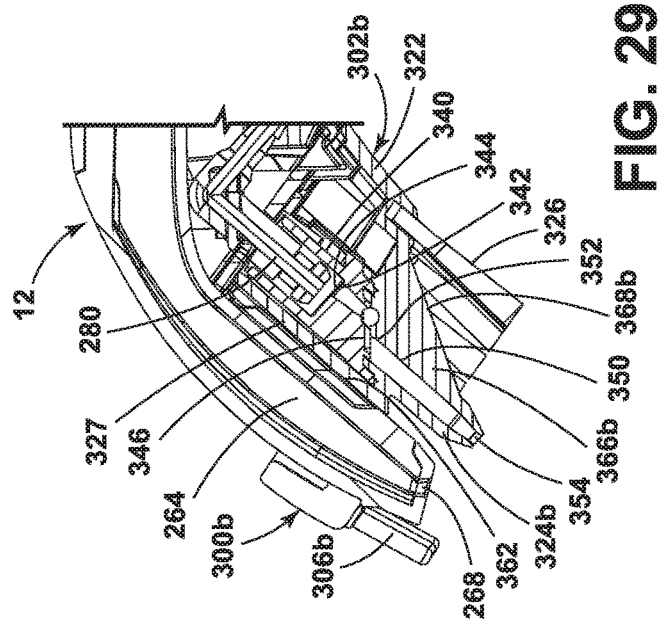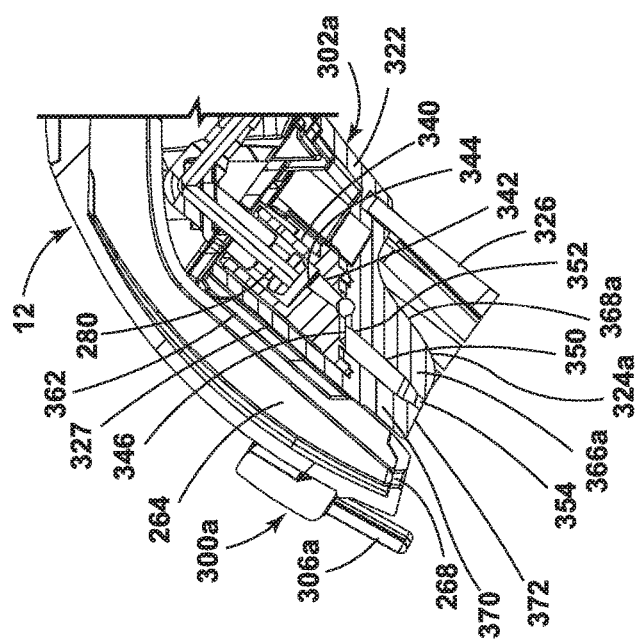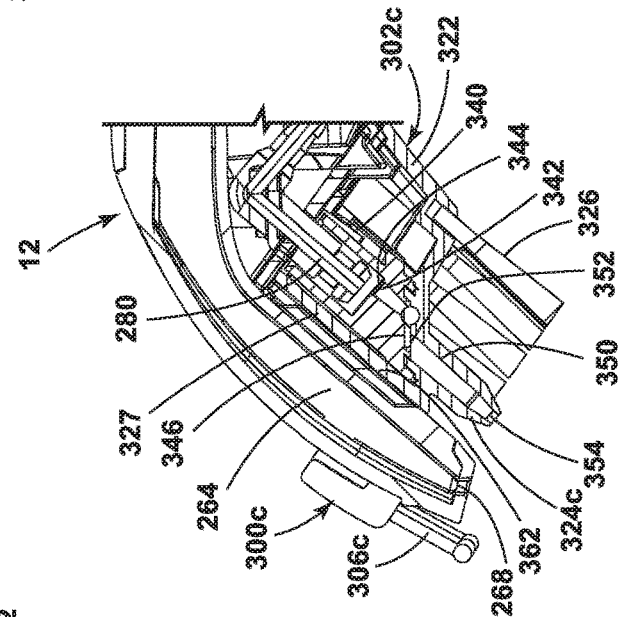
FIG. 28
FIG. 29
FIG. 30

PORTABLE PET GROOMING SYSTEM

CROSS-REFERENCE TO RELATED APPLICATION(S)

This application claims the benefit of U.S. Provisional Application No. 62/890,165, filed Aug. 22, 2019, which is incorporated herein by reference in its entirety.

BACKGROUND

Surface cleaning apparatus can be embodied as a portable or hand-carriable unit, an upright-type unit, a canister-type unit, or a stick-type unit. One exemplary surface cleaning apparatus can be adapted to be hand-carried by a user to a cleaning area. Such a surface cleaning apparatus can be provided with hoses and hand tools adapted for cleaning a variety of surfaces. Some hand tools are adapted in particular for grooming pets by vacuuming hair and other debris from the coat and skin of the pet.

BRIEF SUMMARY

A pet grooming system and various related apparatus are provided herein. The pet grooming system and apparatus, such as various tools and adapters, is configured to: (1) distribute cleaning liquid (which can include water or a mixture of water and another cleaning agent, some non-limiting examples of which include detergent, soap, conditioner, and/or activated hydrogen peroxide) to the skin and/or coat of the pet; (2) agitate and/or massage the cleaning liquid into the pet's coat and/or onto the skin of the pet; and (3) extract used cleaning liquid and debris (which may include dirt, dust, soil, hair, and other debris) from the pet's skin and/or coat.

According to one embodiment of the invention, a pet grooming system includes a hand tool coupled with a portable module via a conduit assembly, at least a portion of which may be in the form of a flexible hose. The portable module includes a delivery system for storing cleaning liquid and delivering the cleaning liquid to the hand tool and a recovery system for removing the spent cleaning liquid and debris via the hand tool and storing the recovered liquid and debris.

In one embodiment, one or more pet grooming tools or attachments are provided. The pet grooming tool can be mounted on the hand tool. In certain embodiments, the pet grooming tool can be customized for particular coat types and can include a plurality of interchangeable sprayer attachments and grooming attachments that can be used in various combinations to effectively groom pets with different coat types. For example, the spraying attachments and grooming attachments can be combined in specific configurations to effectively part different pet coat types during use. The attachments can clip onto the hand tool, or otherwise removably attach to the hand tool for easy interchange of the various attachments.

In one embodiment, the hand tool is configured to concurrently mount one of the plurality of grooming attachments and one of the plurality of sprayer attachments, with the grooming attachment at a first location on a forward portion of a body of the hand tool and the sprayer attachment at a second location on the forward portion of the body of the hand tool.

The sprayer attachments can include spray tips which spray a cleaning fluid into a pet's coat, bristle tufts for agitating a pet's coat, and parting ridges for parting a pet's coat during use. In some embodiments, the parting ridges can be provided on the spray tips. The sprayer attachments can have spray tips, and parting ridges of varying lengths and shapes, including, but not limited to, short-length spray tips with arcuate parting ridges, medium-length spray tips without parting ridges, and long-length spray tips with angled parting ridges.

The grooming attachments can include a comb that is used for arranging the pet's coat and untangling it. The grooming attachments can have combs comprising tines or pins of varying lengths, materials, and shapes, including, but not limited to, rubber pins, plastic tines, and metal tines.

In one embodiment, a grooming tool caddy is removably stored in a recess on the portable module, and one or more pet grooming tools or attachments are removably stored on the caddy.

In one embodiment, an adapter tool is provided. The adapter tool can be installed to an end of a hose to permit the use of pre-existing accessory tools, such as accessory tools for use with portable and upright deep cleaners. Typically, such pre-existing accessory tools do not include a trigger, as control of fluid flow is performed elsewhere. The adapter tool includes a trigger-operated valve mechanism which controls fluid flow. As such, the adapter tool retrofits pre-existing accessory tools for use in the pet grooming system.

In one embodiment, the portable module can include a supply pathway through a housing, at least one supply tank for storing a supply of cleaning liquid which is in fluid communication with the hand tool via the hose, and a fluid delivery pump provided in the fluid pathway between the supply tank and the inlet to the hose to control the flow of liquid to the hand tool.

In certain embodiments, the delivery system includes two supply tanks, a first supply tank for storing a supply of a first cleaning liquid and a second supply tank for storing a supply of a second cleaning liquid. A supply valve is provided and controls the flow of second cleaning solution out of the second supply tank. This permits the ratio of cleaning solution (or other second cleaning liquid) to water (or other first cleaning liquid) being distributed from the hand tool to be controlled. For example, by manipulating the supply valve, the pet grooming system can distribute a mixture of cleaning solution and water, or water only. An actuator lever on the portable module opens and closes the supply valve.

In some embodiments, the second supply tank is nested with the first supply tank. For example, the second supply tank can be contained within a recess provided in the first supply tank.

In one embodiment, the portable module has a carry handle at an upper portion thereof that facilitates carrying the module from one location to another. The carry handle can pivot to a stored position in which the handle conforms to a concave recess at the top of the module.

In one embodiment, the recovery system of the portable module can include a recovery pathway having an air inlet and an air outlet, a recovery tank for receiving recovered liquid and debris for later disposal, and a suction source in fluid communication with the air inlet and the recovery tank for generating a working air stream through the recovery pathway. The suction source includes a vacuum motor, an impeller or working air fan operably coupled with the vacuum motor, and cooling air fan operably coupled with the vacuum motor and which draws motor cooling air through a motor-cooling pathway. An enclosure for the suction source has cooling air inlet holes formed in one portion thereof, and eliminates a direct, unobstructed path for soundwaves exiting the enclosure to reach exhaust air vents of the module.

These and other features and advantages of the present disclosure will become apparent from the following description of particular embodiments, when viewed in accordance with the accompanying drawings and appended claims.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. In addition, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

DESCRIPTION OF THE DRAWINGS

FIG. 3 is a schematic view of a fluid delivery system for the pet grooming system of FIG. 1;

FIG. 4 is a schematic view of a recovery system for the pet grooming system of FIG. 1;

FIG. 19 is a front perspective view of the hand tool from FIG. 2;

FIG. 20 is a cross-sectional view of the hand tool taken through line XX-XX of FIG. 19;

FIG. 25A is a front perspective view of a first embodiment of a sprayer attachment for the hand tool;

FIG. 25B is a bottom perspective view of the sprayer attachment from FIG. 25A;

FIG. 25C is a top perspective view of the sprayer attachment from FIG. 25A;

FIG. 26A is a front perspective view of a second embodiment of a sprayer attachment for the hand tool;

FIG. 26B is a bottom perspective view of the sprayer attachment from FIG. 26A;

FIG. 26C is a top perspective view of the sprayer attachment from FIG. 26A;

FIG. 27A is a front perspective view of a third embodiment of a sprayer attachment for the hand tool;

FIG. 27B is a bottom perspective view of the sprayer attachment from FIG. 27A;

FIG. 27C is a top perspective view of the sprayer attachment from FIG. 27A;

FIG. 28 is a cross-sectional view of a front portion of the hand tool, showing the grooming attachment of FIG. 22A and sprayer attachment of FIG. 25A mounted on the hand tool;

FIG. 29 is a cross-sectional view of a front portion of the hand tool, showing the grooming attachment of FIG. 23A and sprayer attachment of FIG. 26A mounted on the hand tool;

FIG. 30 is a cross-sectional view of a front portion of the hand tool, showing the grooming attachment of FIG. 24A and sprayer attachment of FIG. 27A mounted on the hand tool;

DESCRIPTION OF EMBODIMENTS OF THE INVENTION

The invention generally relates to a pet grooming system and various related apparatus for grooming a pet. The system can comprise components dedicated to pet grooming or can adapt a surface cleaning apparatus or tools normally used for cleaning floors and upholstery to instead groom a pet. While primarily discussed herein in terms of a pet grooming system, the features of the systems and apparatus disclosed herein are applicable to other types of grooming, bathing, or cleaning, including cleaning non-pet surfaces such as floors and upholstery.

Figure 1:
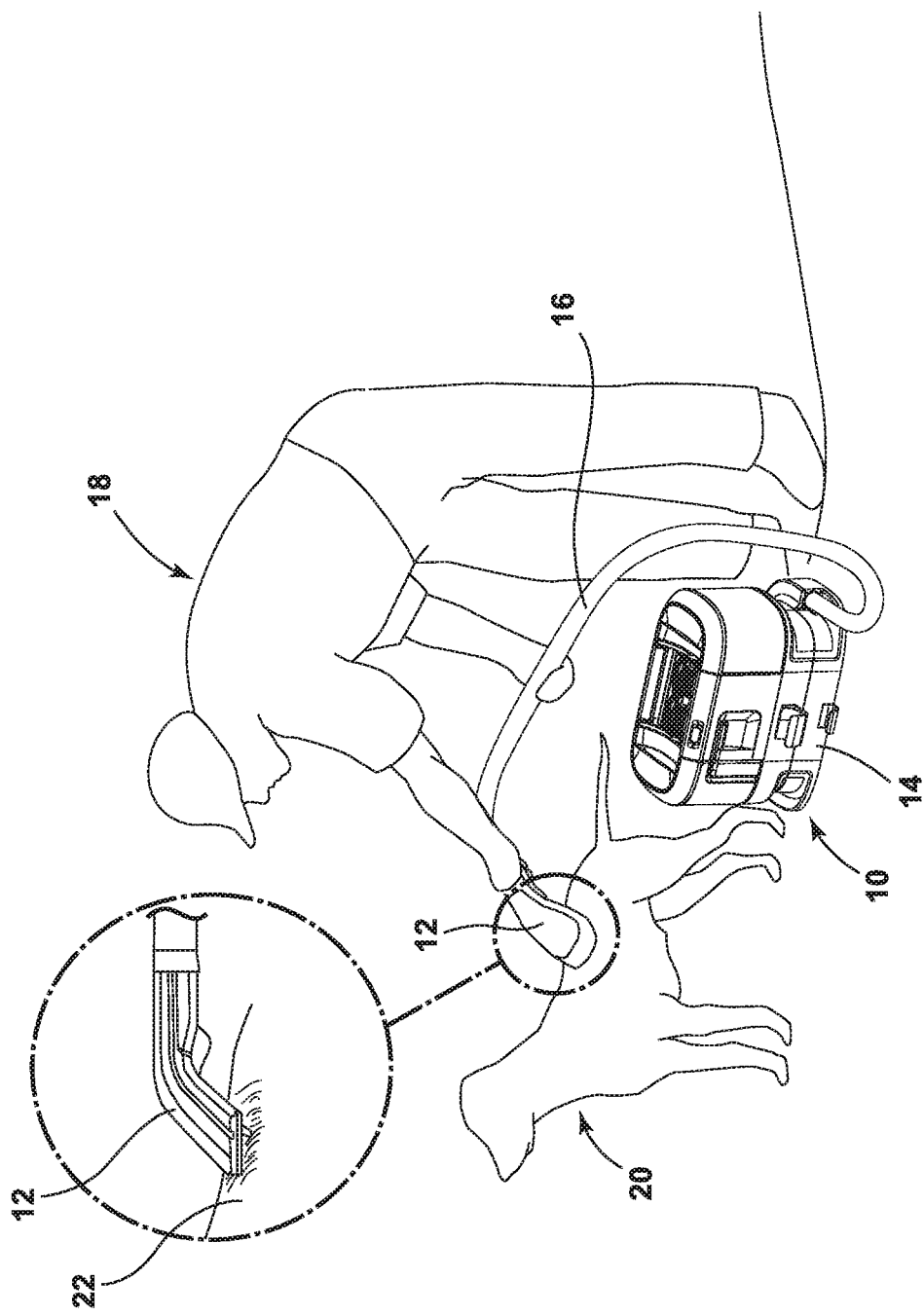
FIG. 1 is a schematic illustration of a pet grooming system according to one embodiment of the invention, the pet grooming system being used to groom a pet.

FIG. 1 is a schematic illustration of a pet grooming system 10 according to one embodiment of the invention. The system 10 includes a hand tool 12 coupled with a portable module 14 via a conduit assembly, at least a portion of which may be in the form of a flexible hose 16. In FIG. 1, the pet grooming system 10 is shown in use by user 18 to groom a pet 20.

The system 10 is configured to: (1) distribute cleaning liquid (which can include water or a mixture of water and another cleaning agent, some non-limiting examples of which include detergent, soap, conditioner, and/or activated hydrogen peroxide) to the skin and/or coat 22 of the pet 20; (2) agitate and/or massage the cleaning liquid into the pet's coat 22 and/or onto the skin of the pet 20; and (3) extract used cleaning liquid and debris (which may include dirt, dust, soil, hair, and other debris) from the pet's skin and/or coat 22. This process can be completed faster than a traditional bath or shower while utilizing less water and can also leave the pet's coat 22 less wet than a traditional bath or shower. For example, the system 10 is expected to use about forty ounces of liquid to clean a fifty-pound dog, whereas a traditional bath would be expected to use significantly more liquid.

Figure 2:
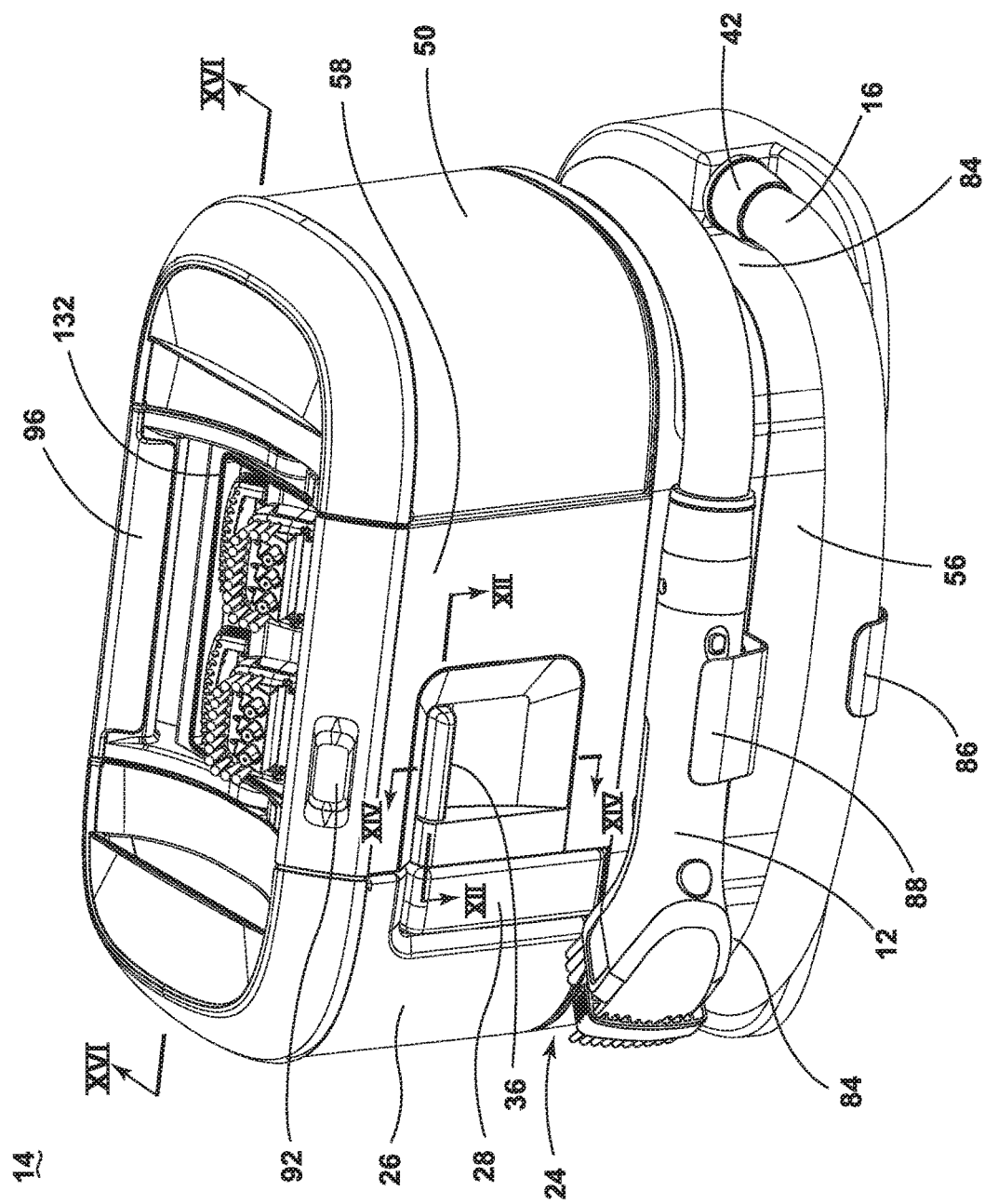
FIG. 2 is a front perspective view of a portable module for the pet grooming system of FIG. 1, with a hand tool and a hose of the system wrapped around the portable module for storage.

Referring to FIG. 2, in general, the portable module 14 includes a delivery system for storing cleaning liquid and delivering the cleaning liquid to the hand tool 12 and a recovery system for removing the spent cleaning liquid and debris via the hand tool 12 and storing the recovered liquid and debris. The module 14 mounts the components of the various functional systems in a portable, hand-carriable unit or housing 24. The module 14 can be configured as a small, compact unit that can be easily carried to the location needed.

For purposes of description related to the module 14 shown in the figures, the terms "upper," "lower," "right," "left," "rear," "front," "vertical," "horizontal," "inner," "outer," and derivatives thereof shall relate to the disclosure of the module 14 as oriented in FIG. 2 in which the module 14 rests on a ground surface and a front of the module 14 is shown in perspective. However, it is to be understood that embodiments of the disclosure may assume various alternative orientations, except where expressly specified to the contrary.

The fluid delivery system of the module 14, which is schematically shown in FIG. 3, can include a supply pathway through the housing 24, at least one supply tank 26, 28 for storing a supply of cleaning liquid which is in fluid communication with the hand tool 12 via the hose 16, and a fluid delivery pump 30 provided in the fluid pathway between the at least one supply tank 26, 28 and the inlet to the hose 16 to control the flow of liquid to the hand tool 12. Various combinations of optional components can be incorporated into the fluid delivery system as is commonly known in the art, such as a heater for heating the cleaning liquid before it is applied to the pet or one more fluid control and mixing valves. The supply pathway can further include various conduits, ducts, or tubes for fluid communication between the various components of the fluid delivery system.

In the illustrated embodiment, the delivery system includes two supply tanks, a first supply tank 26 for storing a supply of a first cleaning liquid and a second supply tank 28 for storing a supply of a second cleaning liquid. The first cleaning liquid can be a water or another rinsing liquid. The second cleaning liquid can be a concentrated cleaning solution. The first supply tank 26 can be larger than the second supply tank 28 and can have a correspondingly larger liquid storage capacity.

The delivery system can further include a supply valve 32 that controls the flow of the second cleaning liquid out of the second supply tank 28. This permits the addition of the second cleaning liquid to the first cleaning liquid distributed from the tool 12 to be controlled. By manipulating the supply valve 32, the pet grooming system 10 can distribute a mixture of the first and second cleaning solution, or the first cleaning solution only. For example, where the first cleaning liquid is water and the second cleaning liquid is a concentrated cleaning solution, by manipulating the supply valve 32, the pet grooming system 10 can first distribute a mixture of solution and water for shampooing the pet by opening the supply valve 32, and then distribute water only for rinsing the pet by closing the supply valve 32.

The delivery system can further include a mixing manifold 34 upstream from the pump 30 that selectively receives cleaning liquid from one or both of the supply tanks 26, 28. For example, with the supply valve 32 open, the mixing manifold 34 receives the first cleaning solution and second cleaning solution, and provides a mixture of the first and second cleaning solutions to the pump 30. With the supply valve 32 closed, the mixing manifold 34 receives the first cleaning solution only and provides only the first cleaning solutions to the pump 30. Optionally, the mixing manifold 34 can be a Y-connector with a first inlet 34A coupled with a conduit, duct, and/or tubing connected with the outlet of the first supply tank 26, a second inlet 34B coupled with a conduit, duct, and/or tubing connected with the outlet of the supply valve 32, and an outlet 34C that feeds into a conduit, duct, and/or tubing connected with the inlet of the pump 30.

In the embodiment shown in FIG. 3, the supply pathway between the outlet of the second supply tank 28 and the mixing manifold 34 can form a second pathway separate from a first pathway from the first supply tank 26 to the inlet of the hose 16. The second pathway joins the first pathway at the mixing manifold 34.

In one embodiment, the supply valve 32 can be a plunger valve in the supply pathway between the outlet of the second supply tank 28 and the mixing manifold 34. A user input control 36, such as a lever or other user-engageable actuator, is provided on the housing 24 that opens and closes the plunger valve to correspondingly permit and prevent flow of the second cleaning solution to the mixing manifold 34. In one example, pressing the actuator lever down toggles the flow off by closing the supply valve 32 and pressing the actuator lever up toggles the flow on by opening the supply valve 32. Details of one embodiment of a suitable supply valve 32 and user input control 36 are described below with respect to FIGS. 12-15. Other suitable user input controls are possible, such as a toggle switch or a push-push button. Other suitable two-position valves are possible as well, including mechanically- or electronically-actuated valves.

Still referring to FIG. 3, using a plunger valve or another two-position valve as the supply valve 32, when the supply valve 32 is open, the ratio of the second cleaning liquid to the first cleaning liquid is fixed, i.e. non-adjustable. Optionally, the mix ratio can be fixed based on a flow restrictor 38 provided in the supply pathway between the supply valve 32 and the mixing manifold 34. The flow restrictor 38 includes an orifice through which the second cleaning solution flows when the supply valve 32 is open. In one embodiment, the flow restrictor 38 is a restriction insert positioned in the conduit, duct, and/or tubing fluidly connecting the outlet of the supply valve 32 to the inlet of the mixing manifold 34 and the size of the orifice is fixed and can be selected based on a desired mix ratio of the second cleaning liquid to the first cleaning liquid.

In another embodiment, the supply valve 32 can be adjustable, which permits the ratio of the second cleaning liquid to the first cleaning liquid distributed from the tool 12 to be controlled. In this case, the supply valve 32 can include a flow restrictor having a controllable orifice or opening time. By controlling the orifice of the flow restrictor or the time that the flow restrictor is open, the composition of the cleaning liquid that is delivered to the hand tool 12 can be controlled. In such an embodiment, where the flow restrictor is integrated with the supply valve 32, the flow restrictor 38 provided in the supply pathway between the supply valve 32 and the mixing manifold 34 can optionally be eliminated.

Referring to FIGS. 2-3, the fluid delivery system of the module 14 further includes an outlet provided at a hose coupler 42 on the housing 24. A mechanical check valve 44 can be provided at the hose coupler 42 to prevent the fluid delivery system from leaking if the hose 16 is detached. The mechanical check valve 44 is normally closed and can be selectively opened by the attachment of the hose 16 at the hose coupler 42. The mechanical check valve 44 automatically closes when the hose 16 is detached from the hose coupler 42. Optionally, when the mechanical check valve 44 is closed and the module 14 is powered on, the pump 30 can operates in a "dead-head" condition, meaning the pump 30 continues to operate, but fluid is recirculated within the pump 30.

The recovery system of the module 14, which is schematically shown in FIG. 4, can include a recovery pathway through the housing 24 having an air inlet 46 and an air outlet 48, a recovery tank 50 for receiving recovered liquid and debris for later disposal, and a suction source 52 in fluid communication with the air inlet 46 and the recovery tank 50 for generating a working air stream through the recovery pathway. Optionally, the air inlet 46 can be provided at the hose coupler 42 (FIG. 2) and can comprise an inlet airflow connector which fluidly couples the hose 16 with the recovery system.

The suction source 52 can include a vacuum motor 54 located fluidly upstream of the air outlet 48 and can define a portion of the recovery pathway. The recovery tank 50 can also define a portion of the recovery pathway and can comprise a separator 55 (FIG. 16A) for separating liquid and debris from the working airstream. Optionally, a pre-motor filter and/or a post-motor filter (not shown) can be provided as well. The recovery pathway can further include various conduits, ducts, or tubes for fluid communication between the various components of the recovery system.

Figure 5:
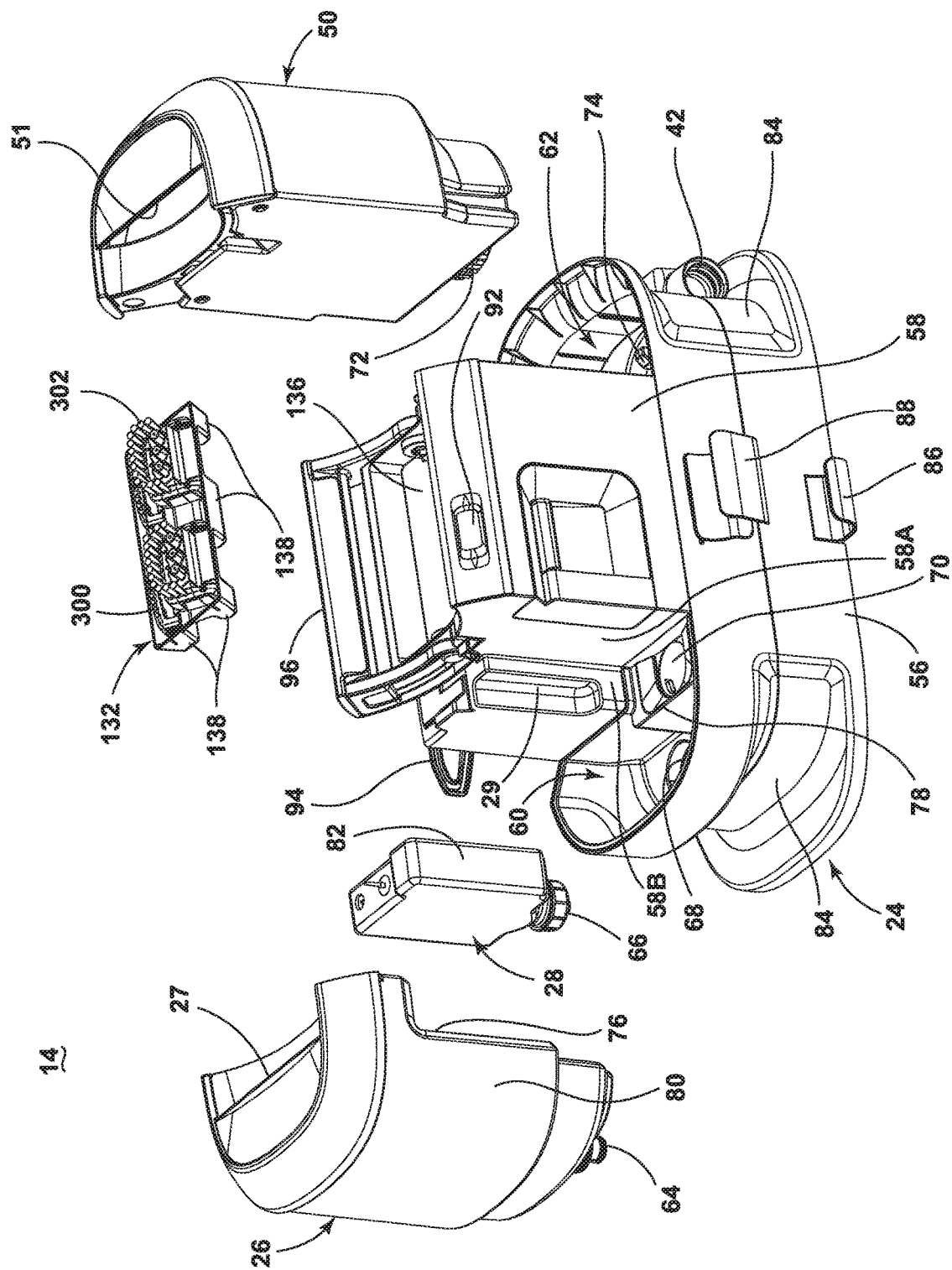
FIG. 5 is a partially exploded view of the portable module of FIG. 2, showing supply and recovery tanks of the module.

Referring to FIG. 5, the main housing 24 can include a base 56 and a partition 58 extending upwardly from the base 56. The base 56 and partition 58 collectively define opposing tank receivers 60, 62 for respectively receiving the supply tanks 26, 28 and recovery tank 50, which are removably mounted on the main housing 24. The supply tank receiver 60 is defined on one side of the partition 58 and the recovery tank receiver 62 is defined on an opposing side of the partition 58.

The partition 58 can be narrower than the base 56, with the seated tanks 26, 28, 50, and partition 58 having substantially the same overall footprint, or alternatively a smaller footprint than, the base 56. In an exemplary embodiment, the main housing 24 can be formed of an opaque material, while the tanks 26, 28, 50 can be formed of a transparent or tinted translucent material so that a user can view the contents of the tanks 26, 28, 50 through their respective sidewalls.

Suitable connectors and/or couplers can be provided in the tank receivers 60, 62 for placing the tanks 26, 28, 50 in fluid communication with their respective systems when the tanks 26, 28, 50 are seated in the receivers 60, 62. For example, the first and second supply tanks 26, 28 can respectively comprise first and second outlet valves 64, 66 that are normally biased to a closed position when the supply tanks 26, 28 are separated from the main housing 24. Corresponding valve receivers 68, 70 are provided in the supply tank receiver 60 and are in fluid communication with components of the delivery system, at least some of which are schematically shown in FIG. 3. For example, the first valve receiver 68 is in fluid communication with the inlet 34A to the mixing manifold 34 and the second valve receiver 70 is in fluid communication with the supply valve 32. The valve receivers 68, 70 open the outlet valves 64, 66 when the supply tanks 26, 28 are seated in the supply tank receiver 60. An exemplary outlet valve and valve receiver is disclosed in U.S. Pat. No. 7,073,226, issued Jul. 11, 2006, which is incorporated herein by reference in its entirety.

The recovery tank 50 can comprise an inlet port 72, and a corresponding port connector 74 can be provided in the recovery tank receiver 62. The port connector 74 is in fluid communication with components of the recovery system, at least some of which are schematically shown in FIG. 4. For example, the port connector 74 is in fluid communication with the vacuum motor 54 to generate a working air stream through the recovery tank 50 and the upstream component of the recovery system. The recovery tank inlet port 72 sealingly couples with the port connector 74 when the recovery tank 50 is seated in the recovery tank receiver 62. An exemplary recovery tank port and port connector is disclosed in U.S. Pat. No. 7,073,226, incorporated above.

The first and second supply tanks 26, 28 can be nested with each other for an efficient use of space on the portable module 14. In the embodiment shown herein where the first supply tank 26 has a larger liquid storage capacity than the second supply tank 28, the second supply tank 28 can nest in a recess 76 provided in the first supply tank 26. Optionally, the first supply tank 26 may have to be removed first before removing the second supply tank 28. Alternatively, the second supply tank 28 can be removable from the recess 76 without first removing the first supply tank 26.

The second valve receiver 70 for the second supply tank 28 can be disposed on raised platform 78 in the supply tank receiver 60 to elevate the second valve receiver 70 above the first valve receiver 68. The platform 78 also provides a visual indicator that shows the user where to seat the smaller second supply tank 28. The platform 78 extends outwardly from the partition 58, and the second supply tank 28 is further disposed against the partition 58 when seated on the raised platform 78 (see, for example, FIG. 2). For example, the partition 58 can include a first side wall 58A extending upwardly from the platform 78, and the second supply tank 28 can be disposed against the first side wall 58A when seated on the platform 78. The partition 58 can optionally further include a second side wall 58B extending upwardly from the platform 78 and forming an inside corner with the first side wall 58A, and the second supply tank 28 can be disposed against the second side wall 58B when seated on the platform 78. Other configurations for nesting the second supply tank 28 with the first supply tank 26 and the main housing 24 are possible.

A sidewall portion 80, 82 of each supply tank 26, 28, respectively, forms an exterior surface of the module 14 when the tanks 26, 28 are received in the supply tank receiver 60. These sidewall portions 80, 82 can be formed of a transparent or tinted translucent material so that a user can view the contents of the tanks 26, 28 through their respective sidewall portions 80, 82, even when the tanks 26, 28 are nested and seated on the receiver 60. This is helpful to assess how much cleaning solution remains in each tank 26, 28 without having to remove either tank 26, 28 from the main housing 24. Alternatively, the two tanks 26, 28 may be arranged in other ways, such as in a stacked arrangement, in a side-by-side arrangement, or arranged on opposing sides of the partition 58. As yet another alternative, one tank having two compartments can be provided instead of two separate tanks.

To aid in lifting the tanks 26, 28, 50 off the main housing 24, the tanks 26, 28, 50 can comprise handles or hand grips. In the embodiment shown herein, the first supply tank 26 and the recovery tank 50 respectively include handles 27, 51 at upper ends thereof. The handles 27, 51 can be integrally molded with the tanks 26, 50, and the user can grip the handles 27, 51 to lift the tanks 26, 50 upwardly out of their respective receivers 60, 62. The second supply tank 28 can be small enough for the user to grip the body of the tank 28 in one hand to remove it from the receiver 60, or can be provided with a handle.

To aid in separating the tank 28, an indentation 29 can be formed in the partition 58 so a user can fit their hand around opposing sides of the tank 28 to more easily lift the tank 28 away from the main housing 24. The indentation 29 can be inaccessible when the first supply tank 26 is seated on the main housing 24. Upon removal of the first supply tank 26, the indentation 29 can be accessed by the user for removal of the second supply tank 28. The indentation 29 can optionally be formed in the second side wall 58B of the partition 58, which can be disposed inwardly of the sidewall portion 82 of the tank 28, i.e. toward the interior of the module 14, when the tank 28 is seated on the tank receiver 60.

Referring to FIGS. 2 and 5, the base 56 includes a hose wrap 84 adapted to receive the hose 16 when it is wrapped around the module 14 for storage, for example as shown in FIG. 2. A hose clip 86 can extend from the base 56 and is adapted to help retain the hose 16 when the hose 16 is wrapped around the module 14. A tool mounting bracket 88 can extend from the base 56 as shown herein, or alternatively from the partition 58, and is adapted to retain the hand tool 12.

A power button 92 is provided on the module 14 for powering one or more electrical components of the module. In an exemplary embodiment, the power button 92 selectively directs power to the pump 30 (FIG. 3) and vacuum motor 54 (FIG. 4). Alternatively, the pump 30 and vacuum motor 54 can be controlled independently by separate buttons.

Figure 6:
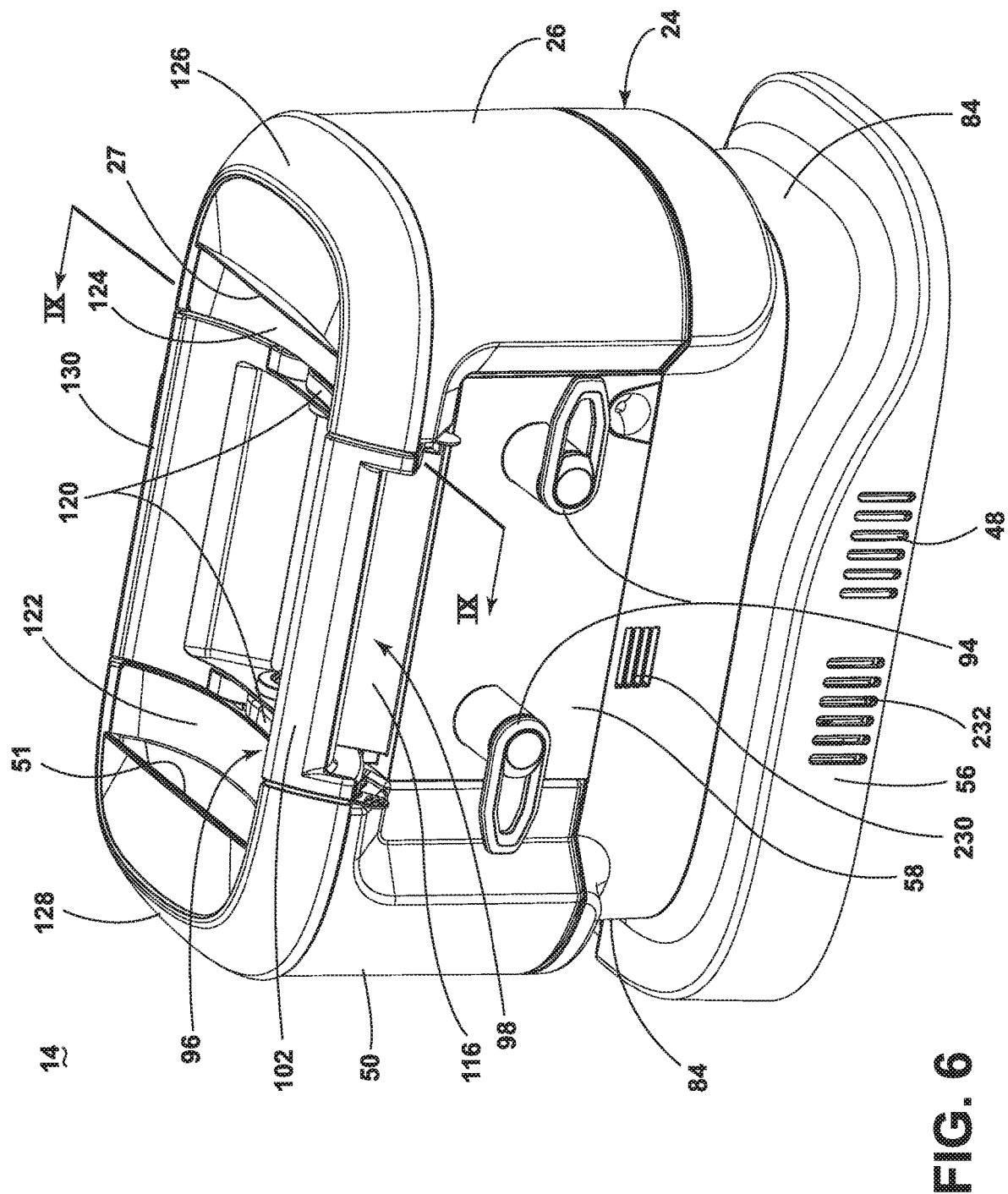
FIG. 6 is a rear perspective view of the portable module of FIG. 2, the portable module including a carry handle shown in a stowed position.

Referring additionally to FIG. 6, a cord wrap 94 can be provided on the partition 58 or another portion of the main housing 24 for storing a power cord (not shown) which emerges from the interior of the module 14 and is used to provide power to electrical components of the module 14 from a source of power, such as a home power supply, upon actuation of the power button 92. Alternatively, the module 14 can be powered by a portable power supply, such as a battery, upon actuation of the power button 92.

With reference to FIGS. 6-10, the portable module 14 includes a carry handle 96 at an upper portion thereof that facilitates carrying the module 14 from one location to another. The carry handle 96 can be pivotally coupled to the main housing 24 and can be provided at an upper end of the main housing 24, although other locations are possible. Optionally, the carry handle 96 is pivotally coupled to the partition 58, as shown herein.

In certain embodiments, the carry handle 96 is stowable on a portion of the module 14. The module 14 can include a handle recess 98 in which the carry handle 96 can be stowed. The carry handle 96 pivots between a stowed position, shown in FIGS. 6 and 9, in which the carry handle 96 is stowed in the handle recess 98, and a carry position, shown in FIGS. 7 and 10, in which the carry handle 96 is pivoted out of the handle recess 98. Stowing the carry handle 96 reduces the overall height of the module 14, relative to an overall height of the module 14 with the carry handle 96 in the carry position, such that the module 14 requires less storage space. In the illustrated embodiment, the carry handle 96 is provided at an upper end of the module 14 to be accessible from above for conveniently lifting and carrying the module 14. Other locations for the carry handle 96 on the module 14 are possible.

Figure 8:
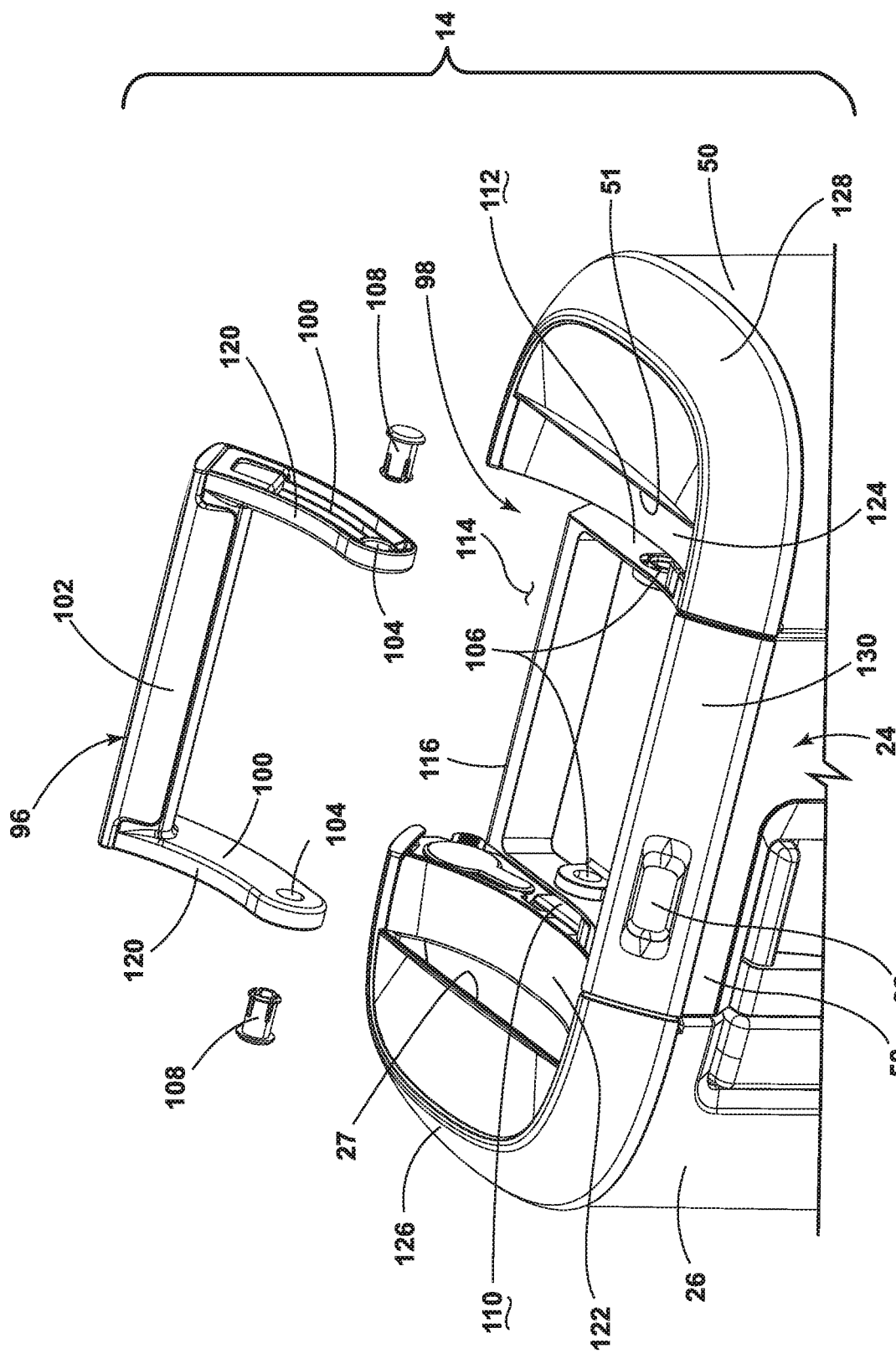
FIG. 8 is a front perspective view of an upper portion of the portable module of FIG. 6, showing the carry handle exploded from the module.

Referring to the exploded view shown in FIG. 8, the carry handle 96 generally includes spaced handle ends 100 and a grip portion 102 extending between the handle ends 100. When in the carry position, the grip portion 102 is offset from the main housing 24 by the handle ends 100. The carry handle 96 can be configured as a generally U-shaped handle by integrally forming the handle ends 100 and grip portion 102 as a single molded piece, or otherwise attaching the handle ends 100 to the grip portion 102. The grip portion 102 can further be overmolded or otherwise provided with a soft material for providing a comfortable hand grip to the user.

In the carry position, a user may conveniently and easily grasp the extended grip portion 102 to carry the module 14 from one location to another.

Figure 7:
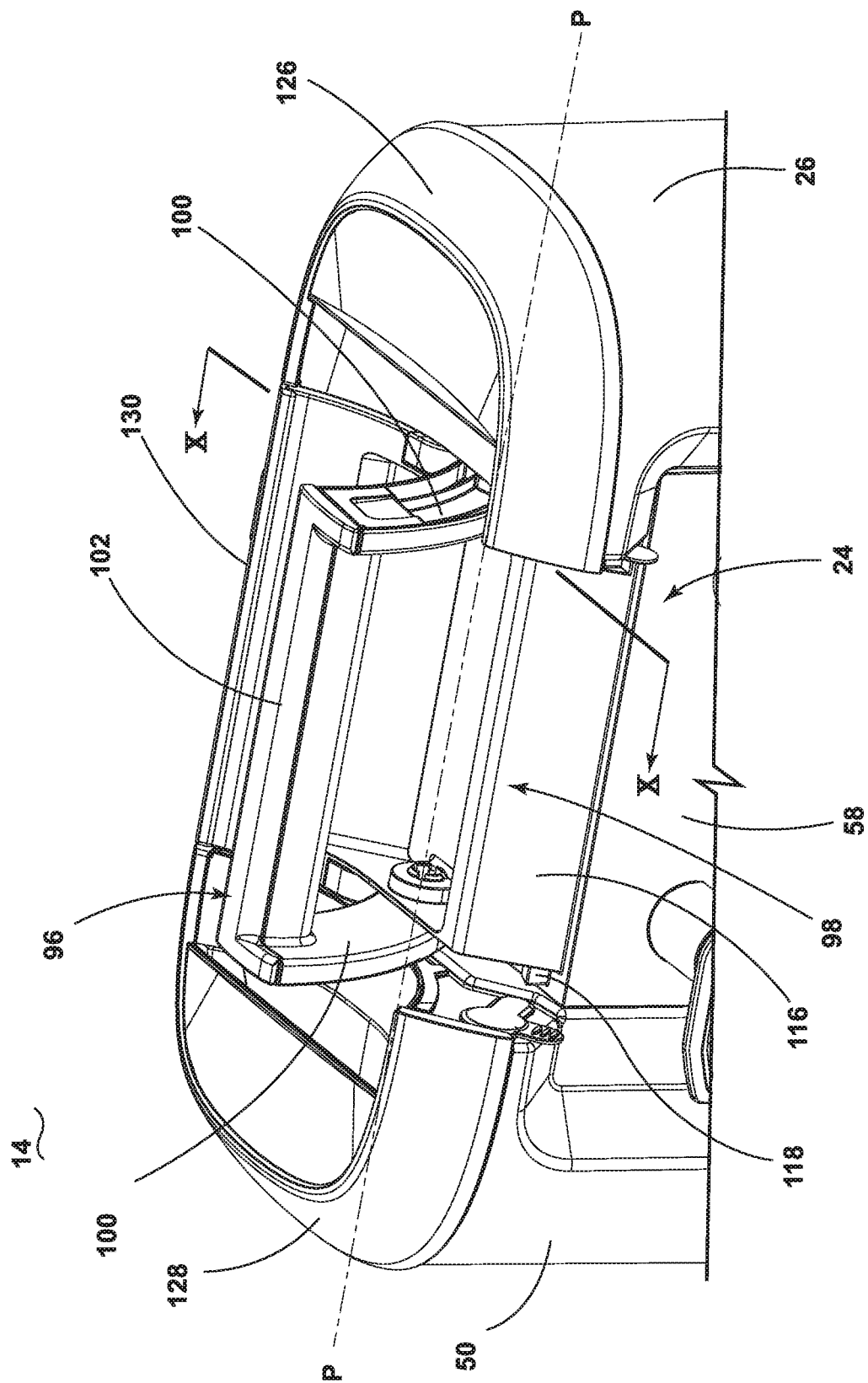
FIG. 7 is a rear perspective view of an upper portion of the portable module of FIG. 6, showing the carry handle in a carry position.
Figure 9:
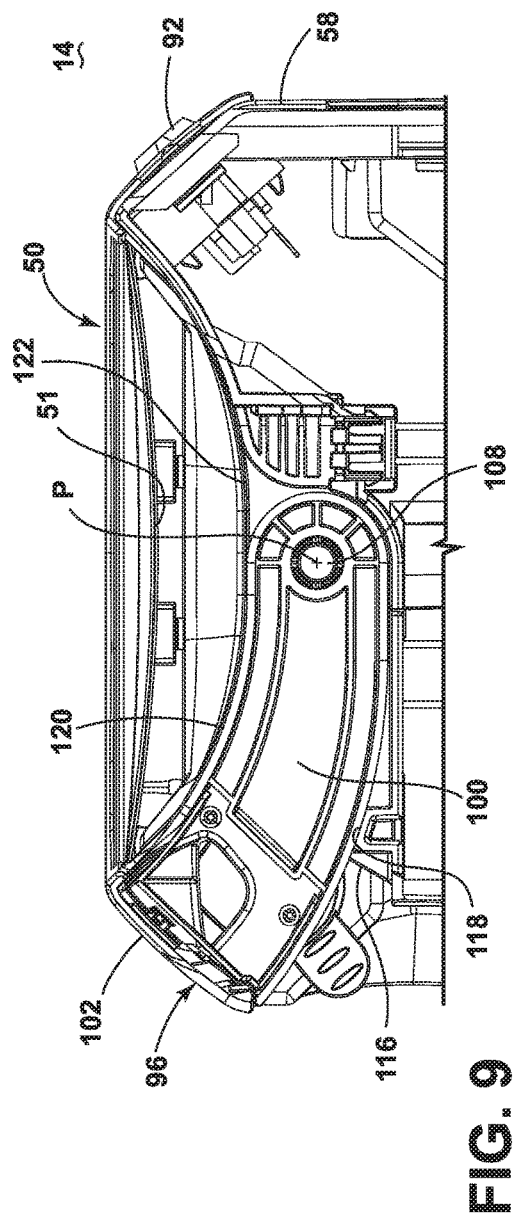
FIG. 9 is a cross-sectional view of the portable module taken through line IX-IX of FIG. 6, showing the carry handle in a stowed position.
Figure 10:
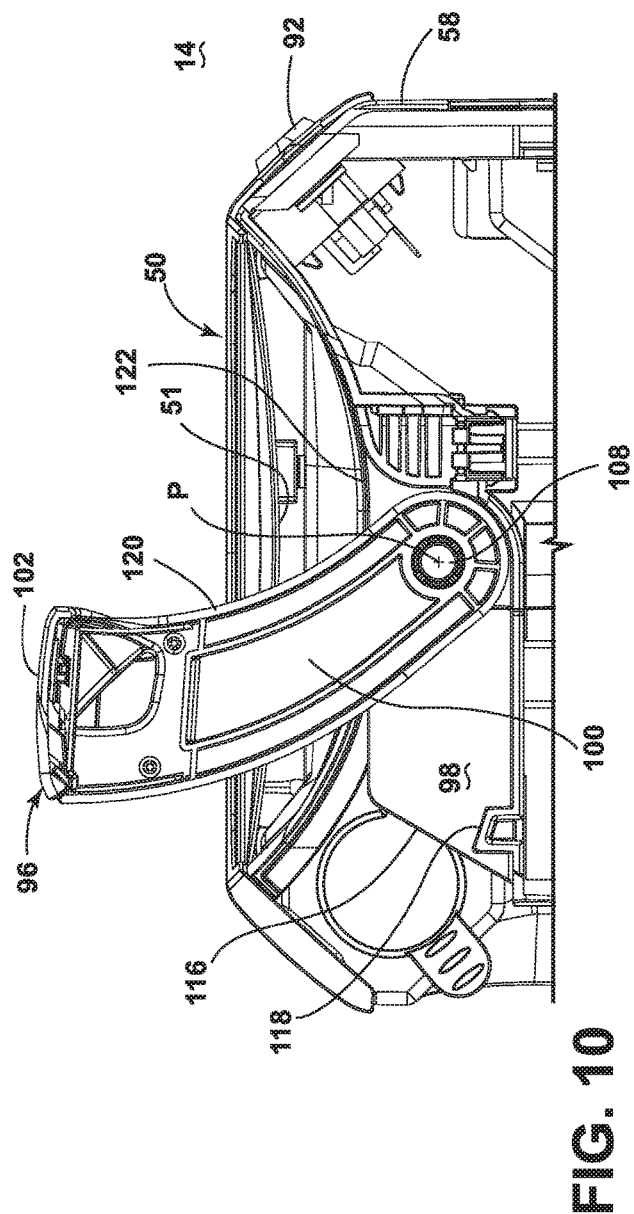
FIG. 10 is a cross-sectional view of the portable module taken through line X-X of FIG. 7, showing the carry handle in a carry position.

The carry handle 96 includes a pivot coupling with the main housing 24. The pivot coupling of the embodiment shown herein includes a pair of handle pivot apertures 104 formed on or otherwise suitably fixed to the handle ends 100 and a pair of housing pivot apertures 106 formed on or otherwise suitably fixed to the main housing 24. A pivot pin 108 is inserted through each pair of coaxially-aligned pivot apertures 104, 106 to rotatably join the carry handle 96 with the main housing 24 and defines a pivot axis P of the carry handle 96, which is shown in FIGS. 7, 9, and 10. Other pivot couplings are possible. In still other embodiments of the module 14, the carry handle 96 can slide or translate between the stowed and carry positions.

The handle recess 98 can be provided as a concave recess at an upper end of the module 14, alternatively at the uppermost surface or top of the module 14. In the carry position (FIGS. 7 and 10), the carry handle 96 is pivoted or otherwise moved out of the handle recess 98 to an orientation wherein a user may conveniently and easily grasp the extended grip portion 102. The handle recess 98 can have a depth substantially equal to or greater than a thickness of the carry handle 96 so that, when stowed, the carry handle 96 does not extend beyond the recess 98.

Portions of the handle recess 98 can be formed by any one of, or any combination of, the main housing 24, the partition 58, the supply tank 26, or the recovery tank 50. In the illustrated embodiment, portions of the handle recess 98 are formed by the partition 58, the supply tank 26, and the recovery tank 50, and the carry handle 96 is substantially flush with the surrounding portions of the tanks 26, 50 when stowed. Referring to FIG. 8, the handle recess 98 includes a first portion 110 which extends along the supply tank 26 to receive one handle end 100, a second portion 112 which extends along the recovery tank 50 to receive the other handle end 100, and a third portion 114 which extends along a rear side of the partition 58 to receive the grip portion 102. The first and second portions 110, 112 run generally transverse to the third portion 114 in the embodiment shown herein.

When in the stowed position, the grip portion 102 can be spaced from a surface 116 of the main housing 24 by a gap or fixed distance so that a user can reach under the grip portion 102 to lift the carry handle 96 out of the recess 98. Standoffs 118 can be provided in the handle recess 98 to maintain the carry handle 96 at the fixed distance from the main housing 24.

Referring to FIGS. 6 and 9-10, the carry handle 96 can conform to the surrounding portions of the module 14 when stowed, such that the carry handle 96 does not extend beyond the recess 98. For example, the handle ends 100 can be arcuate, and the curvature of the arcuate handle ends 100 can match, or substantially match, the curvature of the handle recess 98. In the illustrated embodiment, the handle ends 100 can include arcuate top surfaces 120 that face upwardly when the carry handle 96 is stowed (FIGS. 6 and 9) and are substantially flush with respective arcuate top tank surfaces 122, 124, of the supply tank 26 and recovery tank 50. The top tank surfaces 122, 124 can be adjacent to the tank handles 27, 51, respectively.

In the stowed position, the carry handle 96 can also protect the module 14 from impacts with other objects by the soft grip portion 102 forming an upper and outward edge of the module 14. Referring to FIGS. 6-8, the portable module 14 can have an upper edge defining upper edge portions 126, 128, of the tanks 26, 50 and an upper edge portion 130 of the partition 58. In the stowed position (FIG. 6), the grip portion 102 aligns with the upper edge portions 126, 128, 130 and creates a continuous upper edge around the entire periphery of the module 14. In the carry position (FIG. 7), the grip portion 102 is out of alignment with the upper edge portions 126, 128, 130, such that the upper edge of the module 14 is discontinuous around the periphery thereof.

Referring to FIG. 5, a grooming tool caddy 132 can be provided for holding a plurality of grooming tools 300, 302 as described in further detail below. Other accessories and cleaning supplies may also be stored in the caddy 132. The grooming tool caddy 132 can be an open-topped tray which stores the grooming tools 300, 302 in a single layer in an organized arrangement, so that the user can view all of the stored tools at once and select a desired tool with ease.

The grooming tool caddy 132 can be removably mounted on the module 14. The module 14 can include a caddy recess 136 in which the grooming tool caddy 132 can be received. During use in grooming a pet, the grooming tools 300, 302 may become wet and/or dirty, and the removable grooming tool caddy 132 is easier to clean than if it was not removable from the module 14. The caddy recess 136 can be provided at an upper end of the main housing 24, or alternatively at the uppermost surface or top of the partition 58, and can lie within the boundary of the carry handle 96 when stowed. With the carry handle 96 stowed, the user can remove tools 300, 302 from the tool caddy 132 without obstruction.

The tool caddy 132 can have a plurality of feet 138 on which the tool caddy 132 can rest when detached from the caddy recess 136. The feet 138 can be spaced to fit over the handle pivot coupling when the tool caddy 132 is received in the caddy recess 136.

Figure 11:
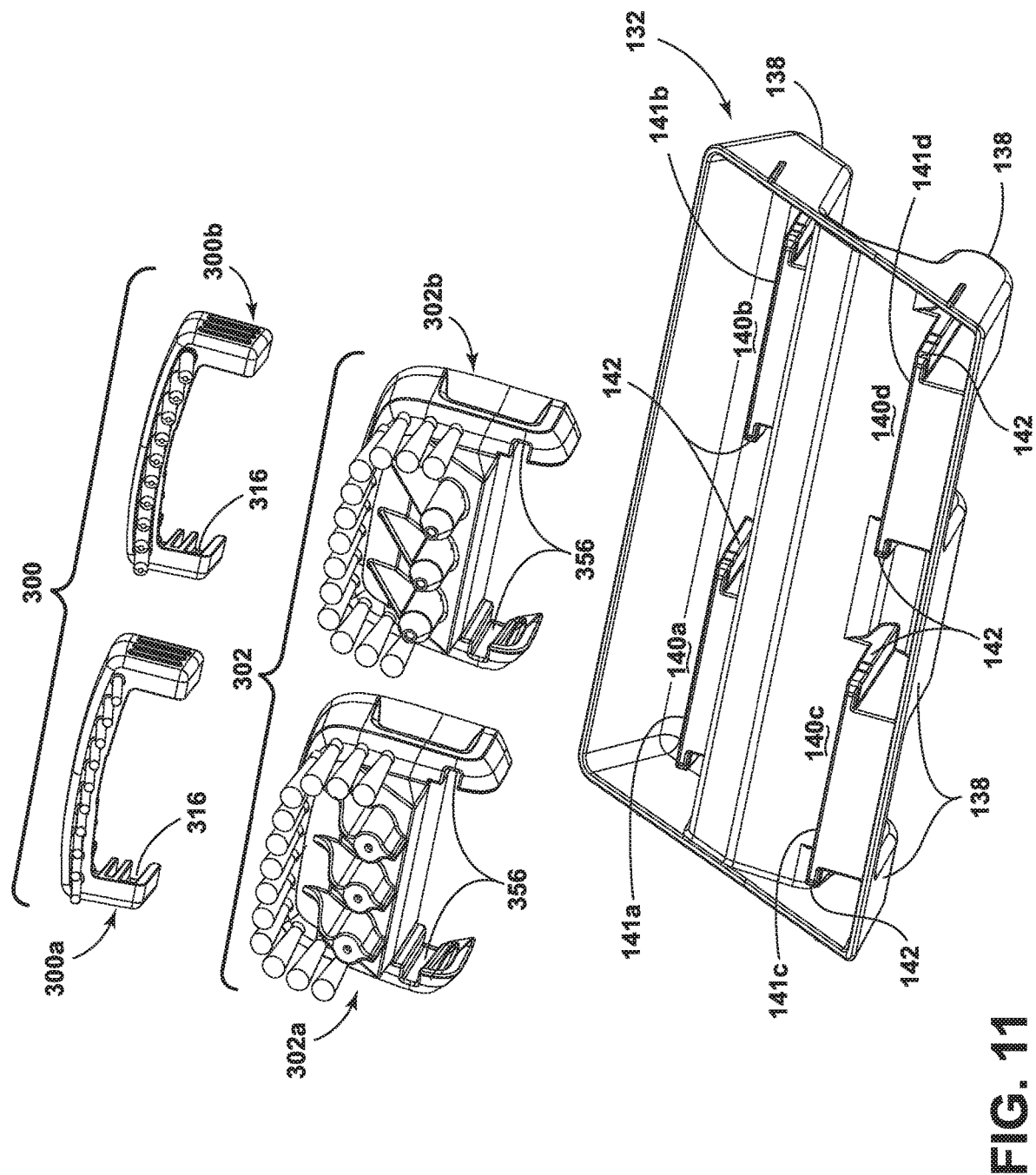
FIG. 11 is an exploded view of a grooming tool caddy and set of grooming tools which can be interchangeably mounted on the hand tool of FIG. 2.

Referring to FIG. 11, the grooming tool caddy 132 can have a plurality of tool storage spaces 140, each of which receives one grooming tool 300, 302. Each tool storage space 140 can include a projection 141 that receives one of the grooming tools 300, 302 in a friction fit. Each grooming tool 300, 302 can have at least one slot 316, 356 that is complementary to the projection 141 to permit the grooming tool 300, 302 to slide onto the projection 141 to retain the tool 300, 302 in the caddy 132. The projections 141 can be T-shaped as shown herein and include opposing flanges 142 that are received by slots 316, 356 on the tools 300, 302; other shapes for the projections 141 are possible.

Optionally, as shown herein, one or more of the tool storage spaces 140 and tool projections 141 can be identical, or substantially identical, to one another, such at least some of the grooming tools 300, 302 can be interchangeably mounted in different spaces 140. For example, in the embodiment illustrated herein, a first set of side-by-side tool storage spaces 140A, 140B and their associated tool projections 141A, 141B can be identical to each other to interchangeably mount two of the grooming tools 300A, 300B. A second set of side-by-side tool storage spaces 140C, 140D and their associated tool projections 141C, 141D can be identical to each other to interchangeably mount two other grooming tools 302A, 302B. Alternatively, each of the tool storage spaces 140 can be particularly configured for one of the grooming tools 300, 302.

Turning to FIGS. 12-15, one embodiment of the supply valve 32 and user input control 36 is shown. As disclosed above with reference to FIG. 3, the supply valve 32 controls the flow of the second cleaning liquid out of the second supply tank 28 in order to control the addition of the second cleaning liquid to the first cleaning liquid distributed from the tool 12. In the embodiment of FIGS. 12-15, the supply valve 32 is a plunger valve in the supply pathway between the second supply tank 28 and the mixing manifold 34.

The supply valve 32 includes a valve body 148 with an inlet port 150 and an outlet port 152 and defining a hollow interior 154. The inlet port 150 is fluidly connected to the second supply tank 28. The outlet port 152 is fluidly connected to the second inlet of the mixing manifold 34.

A fluid passage is formed in the hollow interior 154 of the valve body 148 and provides a pathway for cleaning fluid to flow from the inlet port 150 to the outlet port 152. The fluid passage can be at least partially defined by at least one orifice 156 provided within the valve body 148. Optionally, as shown herein, the orifice 156 can be defined at least in part by an annular washer 158 located within the hollow interior 154 of the valve body 148. The orifice 156 can have any shape and be provided in any form, including but not limited to an opening, aperture, slot, slit, or other passage in the valve body 148.

Figure 13:
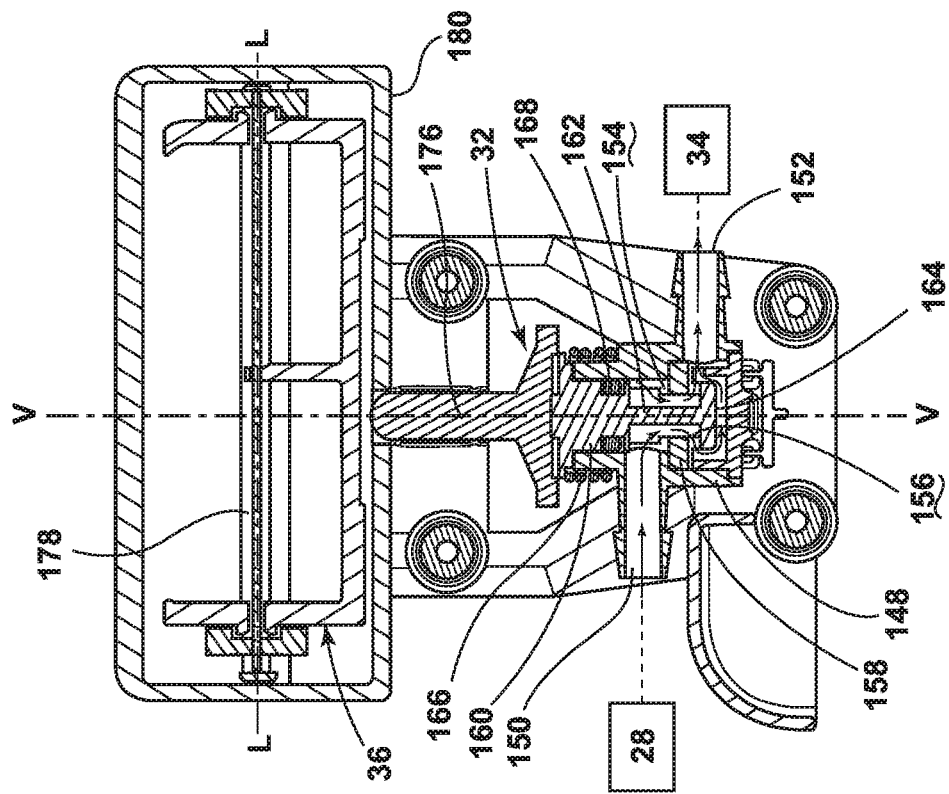
FIG. 13 is a cross-sectional view similar to FIG. 12, with the supply valve in an opened position.
Figure 12:
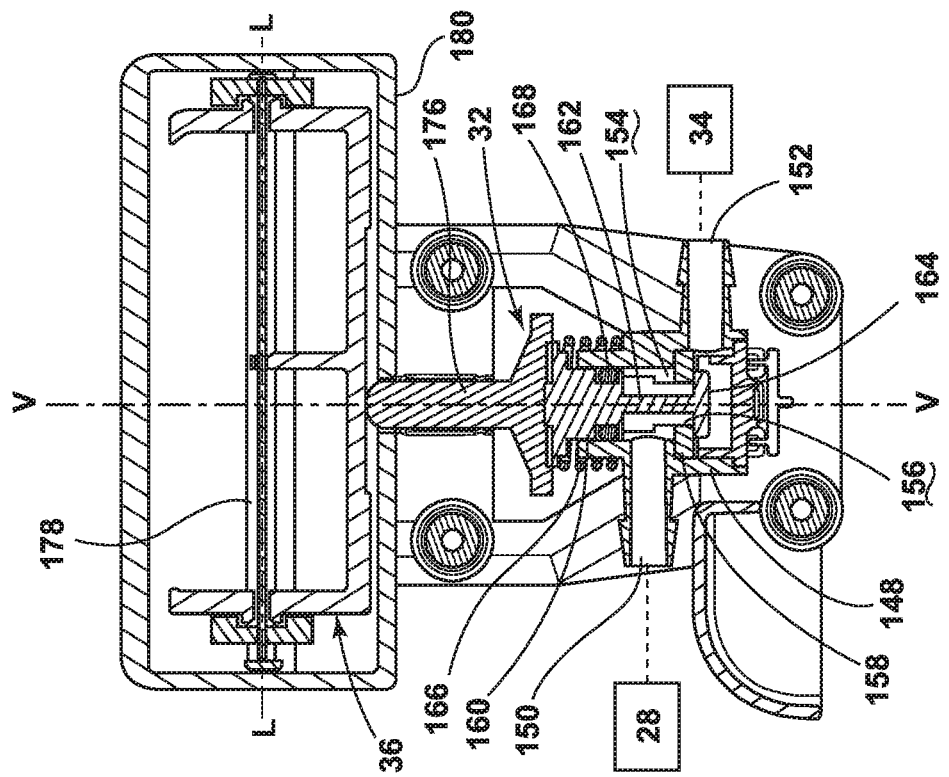
FIG. 12 is a cross-sectional view taken through line XII-XII of FIG. 2, showing one embodiment of a supply valve and user input control for controlling the flow of cleaning liquid out of one of the supply tanks, with the supply valve in a closed position.
Figure 15:
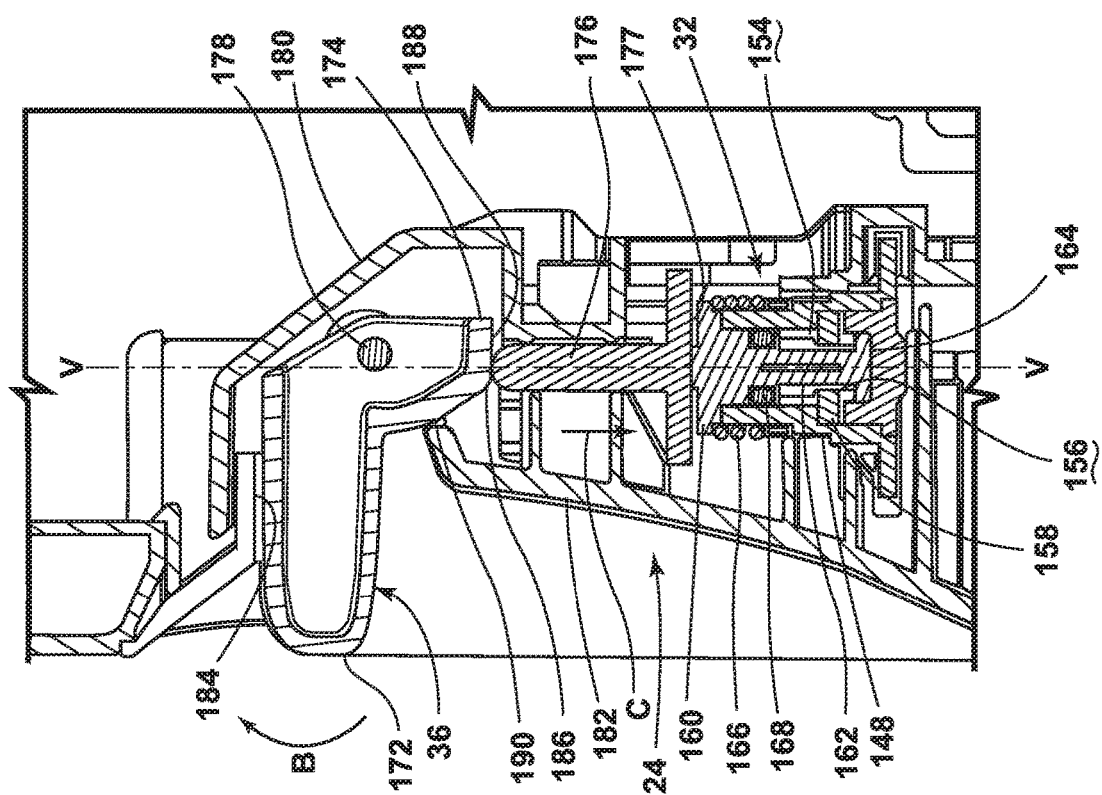
FIG. 15 is a cross-sectional view similar to FIG. 14, with the supply valve in an opened position.
Figure 14:
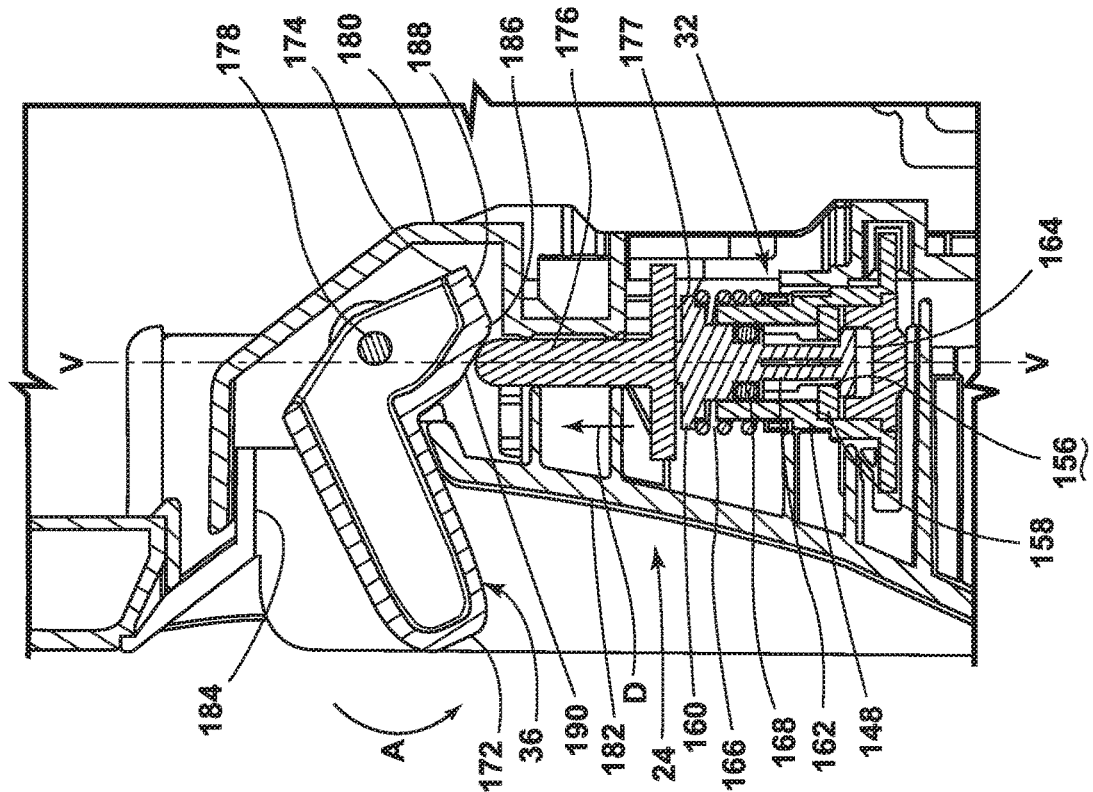
FIG. 14 is a cross-sectional view taken through line XIV-XIV of FIG. 2, with the supply valve in a closed position.

A plunger 160 is arranged with the valve body 148 for linear reciprocal movement along a valve axis V between a closed position shown in FIGS. 12 and 14, and an opened position shown in FIGS. 13 and 15. In the closed position, the plunger 160 is configured to block the flow of liquid through the orifice 156, and prevent liquid from reaching the outlet port 152. In the opened position, the plunger 160 is configured to permit the flow of liquid through the orifice 156 and to the outlet port 152. The plunger 160 can include a plunger stem 162 and a plunger head 164 that seals against the annular washer 158 when the plunger 160 is in the closed position shown in FIG. 12. The plunger head 164 can be continuous or non-continuous about the plunger stem 162 and can project substantially radially outwardly therefrom. Multiple orifices 156 can be defined between the washer 158 and the plunger stem 162.

The plunger 160 can be biased to the closed position (FIGS. 12 and 14) by a return spring 166, such as a coil spring. The return spring 166 can be positioned between the valve body 148 and the plunger 160. In the opened position (FIGS. 13 and 15), the return spring 166 is compressed.

A sealing member 168 can be provided between the plunger 160 and the valve body 148 for sealing an interface between the plunger 160 and body 148 and preventing leaks. In the illustrated embodiment, the sealing member 168 is an O-ring seal on the plunger stem 162 in sealing engagement with an inner side of the valve body 148. Alternatively, more than one O-ring seal can be provided.

The position of the spring-loaded plunger 160 can be controlled via the user input control 36 for the supply valve 32. The user input control 36 shown is a control lever accessible from the exterior of the housing 24. The control lever 36 is operably coupled to the plunger 160 to selectively move the plunger 160 relative to the orifice 156 to open or close the supply valve 32. Other actuators for the supply valve 32 are possible.

As best shown in FIGS. 14-15, the control lever 36 includes a handle or user-input end 172 and a cam end 174. The cam end 174 engages a switch shaft 176 operably coupled with the plunger 160. The cam end 174 includes a varied cam surface 186 that is configured to force the switch shaft 176 downwardly to open the supply valve 32 and to release the switch shaft 176 to close the supply valve 32. The return spring 166 forces the plunger 160 upwardly, which in turn forces the switch shaft 176 into contact with the cam surface 186.

When the switch shaft 176 is forced downwardly by the cam end 174, a lower end 177 of the switch shaft 176 pushes against the plunger 160 and forces the plunger 160 to move linearly within the valve body 148, along the valve axis V, to the opened position. One end of the valve body 148 can be at least partially open to accommodate for the movement of the plunger 160. A portion of the plunger stem 162 is exterior of the valve body 148 for engagement with the lower end 177 of the switch shaft 176.

The control lever 36 is pivotably mounted on a shaft pin 178, which is fixed to the main housing 24, for rotation about an axis L. A mounting bracket 180 can mount the valve 32 to an exterior wall 182 of the main housing 24, the exterior wall 182 including an opening 184 through which at least the user-input end 172 of the lever 36 projects.

The control lever 36 can be moved or toggled between at least two positions, including a first position, shown in FIG. 14, in which the user-input end 172 of the lever 36 is pressed down, i.e. as indicated by arrow A, and a second position, shown in FIG. 15, in which the user-input end 172 of the lever 36 is pushed up, i.e. as indicated by arrow B. The first position shown in FIG. 14 corresponds to the closed position of the supply valve 32 and the second position shown in FIG. 15 corresponds to the opened position of the supply valve 32. In one example, pressing the control lever 36 down toggles the flow of the second cleaning liquid from the second supply tank 28 to the manifold 34 off by closing the supply valve 32. Pressing the control lever 36 up toggles the flow on by opening the supply valve 32.

The opened position of the supply valve 32 can correspond to a shampoo mode in which a mixture of the first and second cleaning solutions from the two supply tanks 26, 28 is distributed for shampooing the pet. The closed position of the supply valve 32 can correspond to a rinse mode in which only the first cleaning solution from the first supply tank 26 (FIG. 3) is distributed for rinsing the pet.

When the control lever 36 is flipped up into the second position, or shampoo mode position, the switch shaft 176 is forced downwardly, i.e. as indicated by arrow C in FIG. 15, by a first portion 188, optionally a flat portion, of the cam surface 186 such that the supply valve 32 is open. When the control lever 36 is flipped down into the first position, or rinse mode position, the switch shaft 176 is released such that the return spring 166 forces the switch shaft 176 upwardly, i.e. as indicated by arrow D in FIG. 14, into contact with a second portion 190, optionally an angled portion, of the cam surface 186, and the supply valve 32 is closed. The return spring 166 further acts to maintain the control lever 36 in the position selected by the user by pressing the switch shaft 176 against the cam end 174 in both the first and second positions.

Figure 16A:
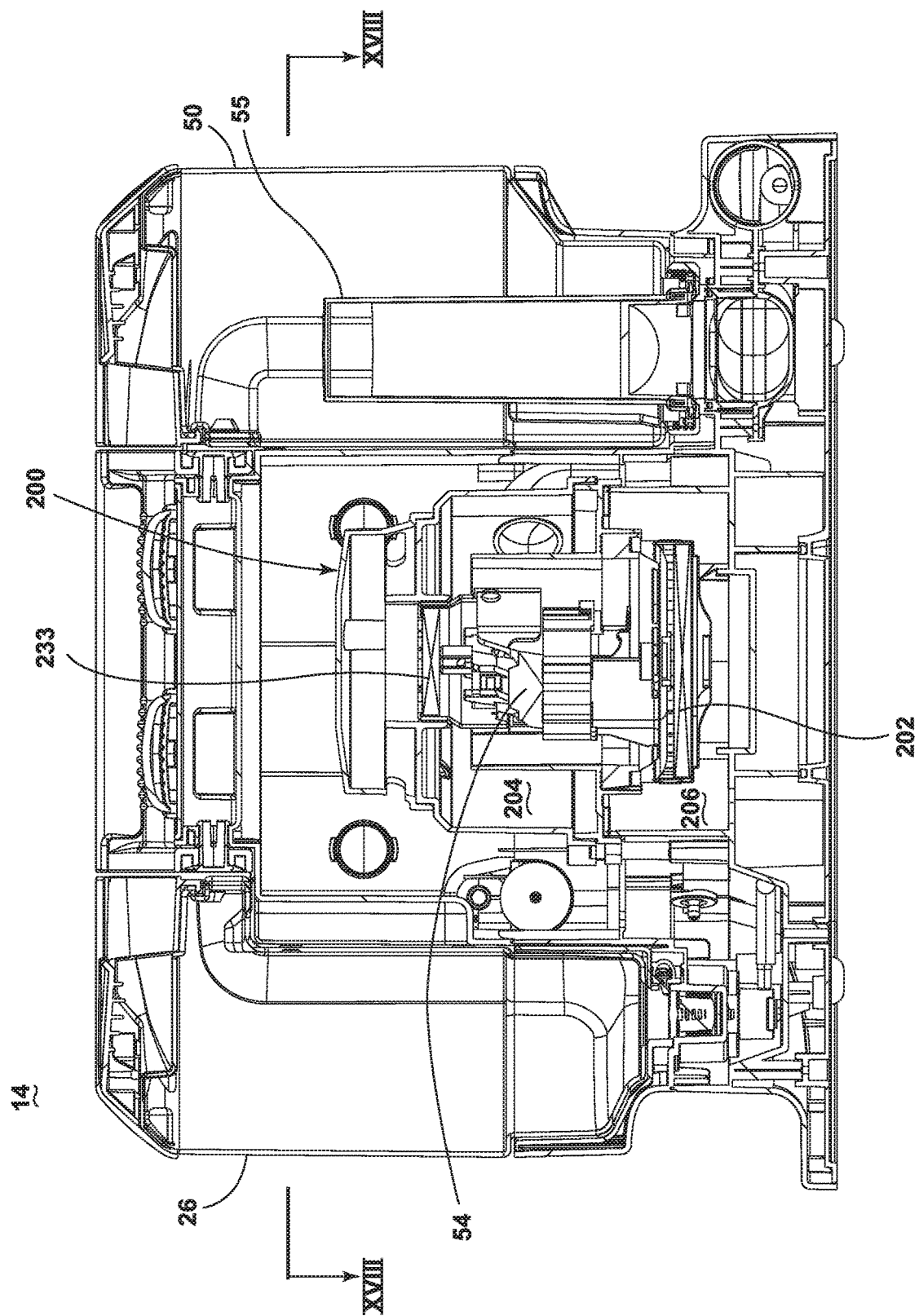
FIG. 16A is a cross-sectional view taken through line XVI-XVI of FIG. 2, showing an enclosure for a suction source of the portable module.
Figure 16B:
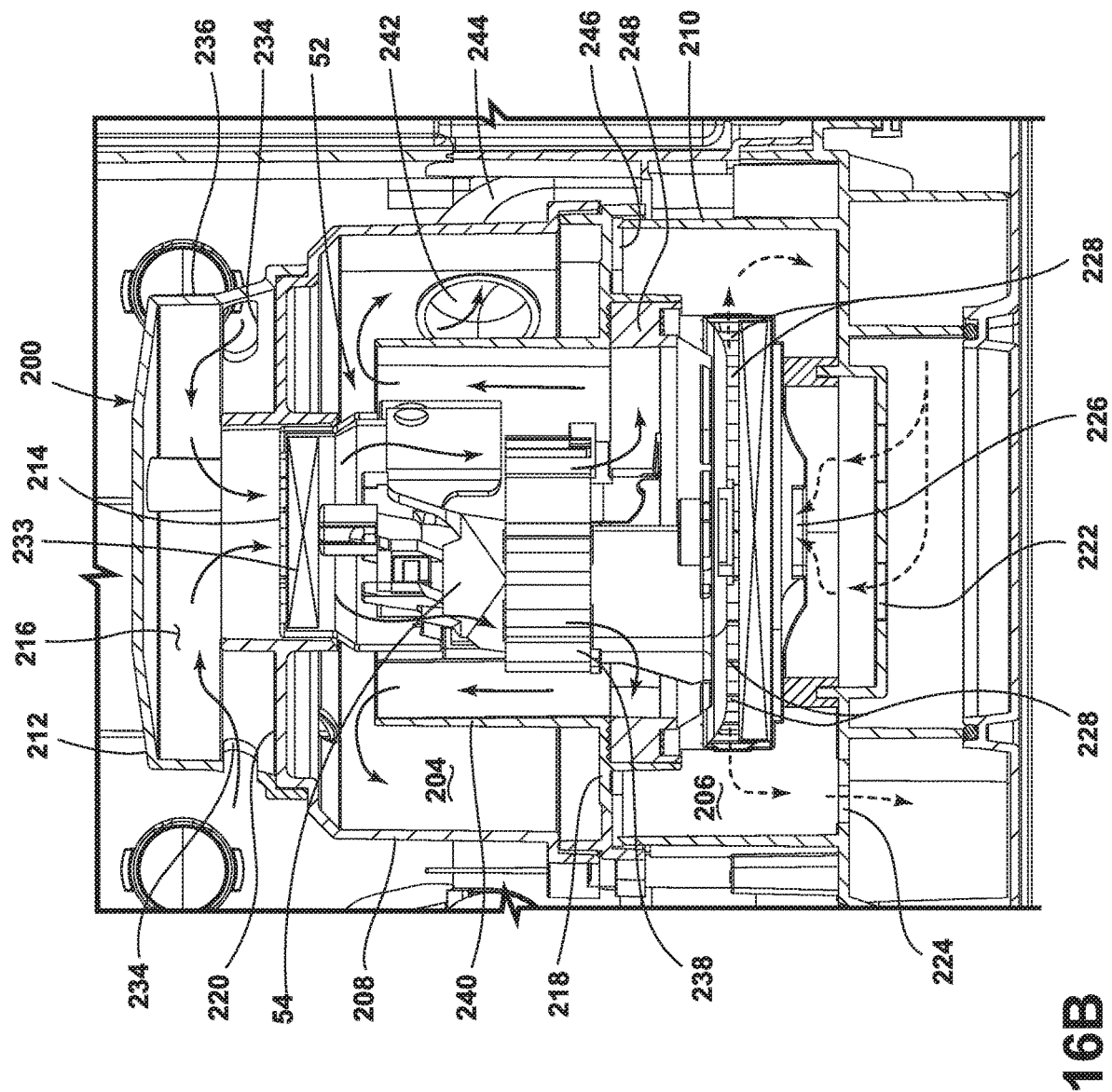
FIG. 16B is an enlarged view of a portion of FIG. 16A.

Referring to FIGS. 16A-16B, one embodiment of an enclosure 200 for the suction source 52 is shown. The suction source 52 includes the vacuum motor 54, as discussed previously, and includes an impeller or working air fan 202 operably coupled with the vacuum motor 54. The enclosure 200 can include a motor chamber 204 in which the vacuum motor 54 is housed and a fan chamber 206 in which the working air fan 202 is housed.

The enclosure 200 can be made up of one or more separate pieces, casings, or housings. In the illustrated embodiment, the enclosure 200 includes a motor housing 208 that defines the motor chamber 204 and a fan housing 210 that defines the fan chamber 206. The enclosure 200 can further include a cooling air intake housing 212 that encloses an inlet vent 214 to the motor 54 and defines a cooling air intake chamber 216. A first dividing wall 218 separates the motor chamber 204 from the fan chamber 206 and can optionally be formed as part of the motor housing 208 or fan housing 210, or as a separate element. A second dividing wall 220 separates the motor chamber 204 from the cooling air intake chamber 216 and can optionally be formed as part of the motor housing 208 or cooling air intake housing 212 or as a separate element.

Figure 17:
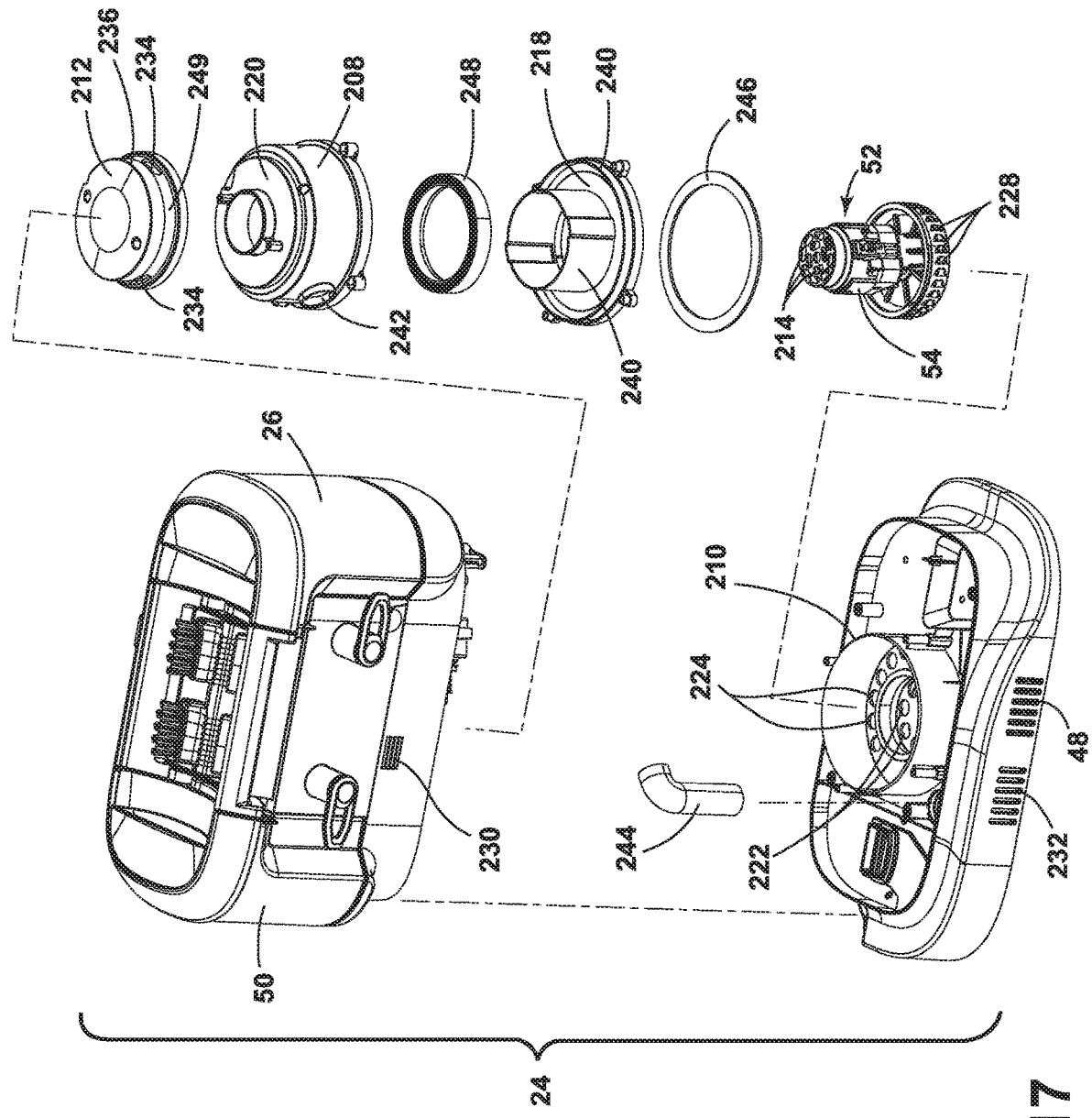
FIG. 17 is a partially-exploded view of the portable module, showing components of the enclosure for the suction source.

Referring additionally to FIG. 17, a working air path through the enclosure 200 includes at least one intake opening 222 in fluid communication with the working air fan 202 and an exhaust opening 224 in fluid communication with the air outlet 48 of the recovery pathway. Optionally, the air outlet 48 can be formed by exhaust vents in the main housing 24. The intake and exhaust openings 222, 224 can be defined by at least one, or a plurality of, openings in the fan housing 210 of the enclosure 200. In the illustrated embodiment, working air that has exited the recovery tank 50 flows through a plurality of intake openings 222 in the fan housing 210 and into a fan inlet 226, which can be located at the center of the working air fan 202. Working air is then expelled through fan outlets 228 around the perimeter of the working air fan 202 into the fan chamber 206 and passes out of the enclosure 200 through the plurality exhaust openings 224. The intake and exhaust openings 222, 224 can be disposed about a rotational axis F of the working air fan 202, with the intake openings 222 forming an inner ring of openings and the exhaust openings 224 forming an outer ring of openings disposed concentrically with the inner ring of openings. The flow of working air through the enclosure 200 is indicated in FIG. 16B by dashed-line arrows.

Sealing members can be provided between one or more separate pieces, casings, or housings of the enclosure 200 for sealing interfaces between the separate pieces, casings, or housings and preventing the working air from leaking out of the recovery path. In the embodiment shown, a first sealing member or gasket 246 can be provided at an interface between the motor housing 208 and the fan housing 210. A second sealing member or gasket 248 can be provided at an interface between the suction source 52 and the enclosure 200 to dampen vibrations.

The module 14 can include a motor-cooling pathway through the housing 24 having a cooling air inlet 230 and a cooling air outlet 232, shown in FIG. 17, with the motor-cooling pathway providing cooling air to the vacuum motor 54 and for removing heated cooling air from the vacuum motor 54. A cooling air fan 233 operably coupled with the vacuum motor 54 draws motor cooling air through the motor-cooling pathway. Both the cooling air inlet 230 and the cooling air outlet 232 are in fluid communication with ambient air outside the module 14. Optionally, the cooling air inlet 230 and cooling air outlet 232 can be formed by inlet and outlet vents formed in the main housing 24.

At least a portion of the motor-cooling pathway extends through the enclosure 200. At least one cooling air intake opening 234 can be formed in the enclosure 200, such as in the cooling air intake housing 212 as shown in FIG. 16B, for cooling air from the inlet vent 230 to enter the cooling air intake chamber 216 in which the cooling air fan 233 is housed. Multiple intake openings 234 can be formed in the enclosure 200, such as in a side wall 236 of the enclosure 200 defined by the housing 212. From the cooling air intake chamber 216, motor cooling air passes through the inlet vent 214 at one end of the motor 54 and flows over the motor 54. Heat from the motor 54 transfers to the motor cooling air. The heated motor cooling air moves through outlet vents 238 at an opposite end of the motor 54 and is guided upwardly by a baffle 240 comprising a sleeve extending circumferentially around the motor 54, before turning downwardly to exit the enclosure 200 through an exhaust port 242, which can be formed in the motor housing 208. The exhaust port 242 is in fluid communication with the outlet vents 232 formed in the main housing 24, such as via an exhaust conduit 244 extending from the exhaust port 242 to the outlet vents 232. The flow of motor cooling air through the enclosure 200 is indicated in FIG. 16B by solid-line arrows.

The enclosure 200 is configured to obstruct the path of sound waves from the motor 54 to the exterior of the module 14, and ensures all sound emitted by the vacuum motor 54 reflects off multiple surfaces before exiting the module 14 and reaching the user. This reduces the noise of the module 14 as perceived by the user. With prior art floor care appliances, the motor-cooling pathway often provides a fairly direct path for sound from the motor to reach the exterior of the appliance, which increases the noise of the appliance as perceived by the user. In the embodiment of the module 14 shown herein, there is no direct path, or line of sight, for sound waves to flow from the motor 54 to the outlet vent 232. The outlet vent 232 opening to the atmosphere are provided at one side of the enclosure 200, and the cooling air intake openings 234 into the enclosure 200 are provided on a different side of the enclosure 200. This configuration forces sound waves from the motor 54 to reflect off multiple surfaces inside of the main housing 24 before exiting through the outlet vent 232, thereby reducing sound level.

Figure 18:
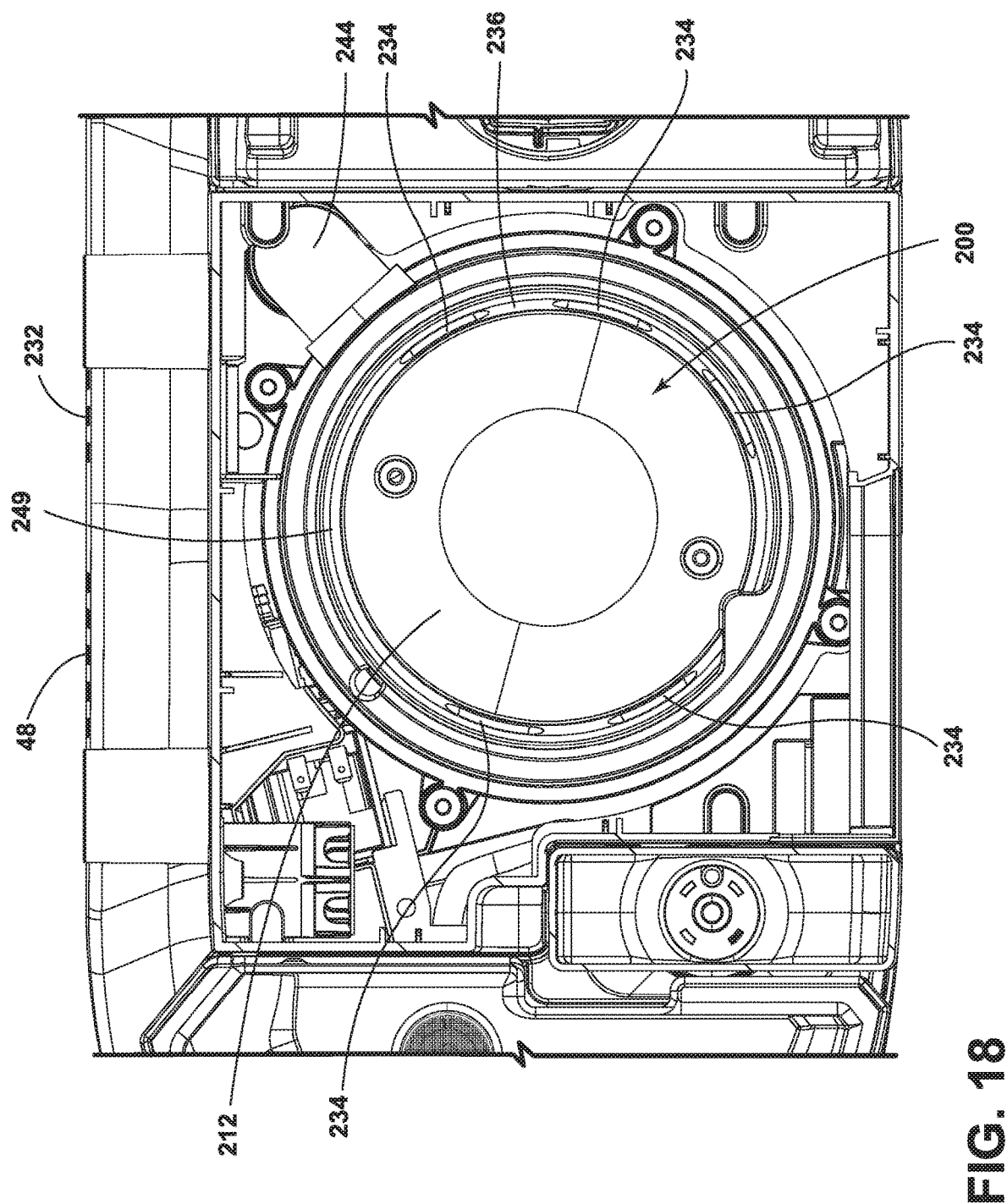
FIG. 18 is a cross-sectional view taken through line XVIII-XVIII of FIG. 16A, showing a top view of the enclosure for the suction source.

Optionally, when viewed from the top, as shown in FIG. 18, the cooling air intake openings 324a are formed around less than the entire perimeter or circumference of the enclosure 200, rather than around the entire perimeter or circumference of the enclosure 200. A portion 249 of the enclosure 200 lacking cooling air intake openings 234 faces one or more of the vent openings in the main housing 24, including one or more of the recovery pathway air outlet 48, the motor-cooling pathway outlet vent 232, and/or the cooling air inlet 230 (FIG. 17), thereby eliminating a direct, unobstructed path between soundwaves exiting the enclosure via the openings 234 and one or more of the ambient air openings in the main housing 24. The portion 249 can be a section of the cooling air intake housing 212 that is impermeable to air flow. The section can be a section of the side wall 236 of the enclosure 200 defined by the cooling air intake housing 212 which extends between two of the openings 234.

The enclosure 200 is further configured to force cooling air to follow a torturous path, including around the baffle 240. Sound wave energy is also absorbed by the baffle 240, which sits outside the outlet vents 238 of the motor 54.

Referring to FIGS. 19-20, one embodiment of the hand tool 12 is shown, along with some details of the hose 16 in the case of FIG. 20. The hand tool 12 comprises a main housing or body 250 that is hand-holdable by a user and can be easily held within and operated by one hand of the user. The body 250 can be collectively formed by one or more housings. The tool 12 includes a delivery pathway 252 and a recovery pathway 254 extending through the body 250.

For purposes of description related to the hand tool 12 shown in the figures, the terms "upper," "lower," "right," "left," "rear," "front," "vertical," "horizontal," and derivatives thereof shall relate to the hand tool 12 as oriented in FIG. 19 from the perspective of a user holding the hand tool 12 in a normal operating position (see FIG. 1). However, it is to be understood that embodiments of the disclosure may assume various alternative orientations, except where expressly specified to the contrary.

The hose 16 can include a delivery conduit 256 defining a portion of a fluid delivery pathway of the system 10 and a suction conduit 258 defining a portion of a recovery pathway of the system 10. When the tool 12 is coupled with the hose 16, as shown in FIG. 20, the tool delivery pathway 252 is fluidly coupled with the hose delivery conduit 256 and the tool recovery pathway 254 is fluidly coupled with the hose suction conduit 258. In an exemplary embodiment, an outer tube 260 can define the suction conduit 258, while a smaller, inner tube 262 inside the outer tube 260 defines the delivery conduit 256; alternatively, two separate conduits can be provided.

Figure 21:
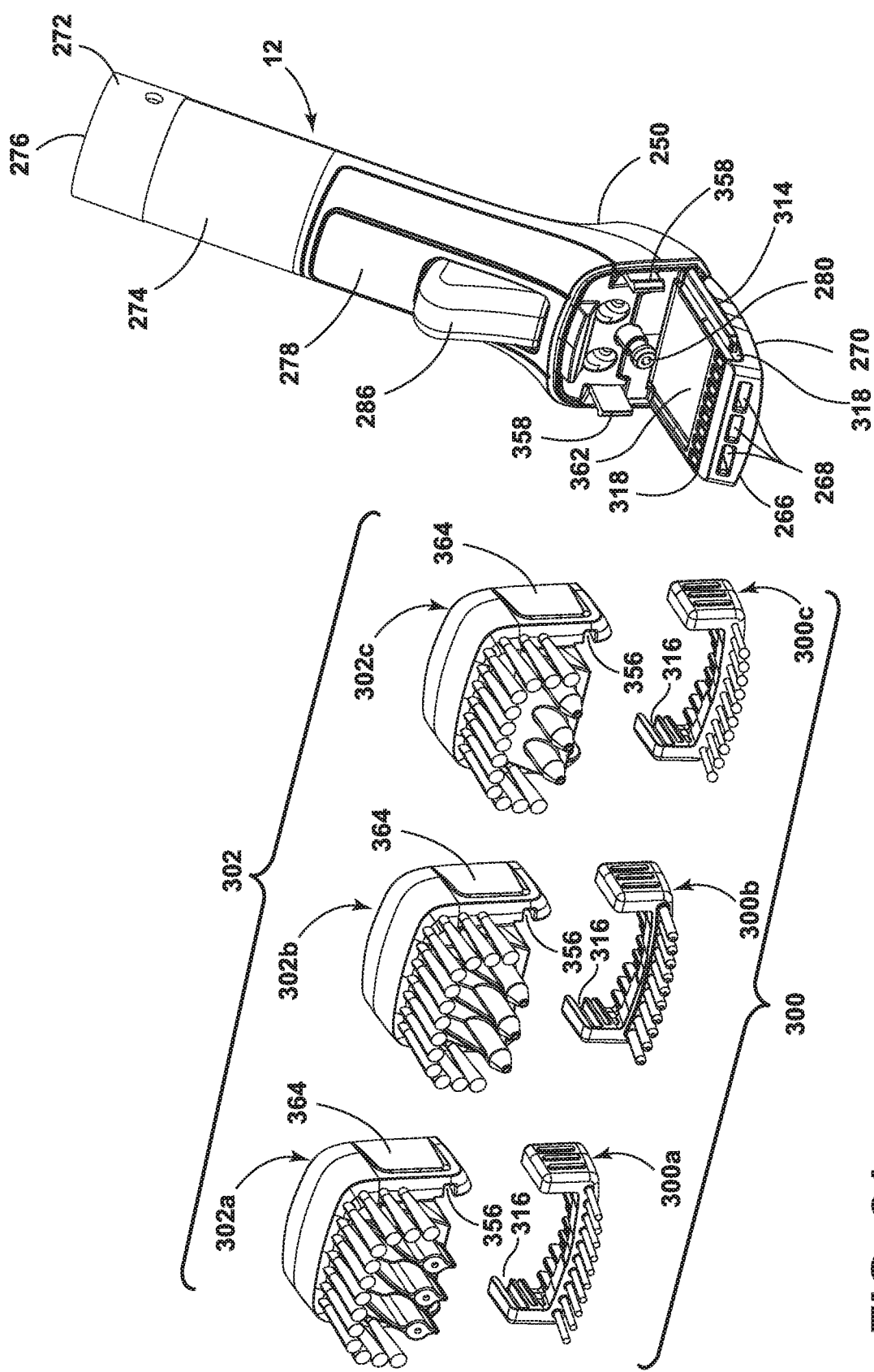
FIG. 21 is bottom perspective exploded view of the hand tool, showing a set of grooming tools which can be interchangeably mounted on the hand tool.
Figure 24A:
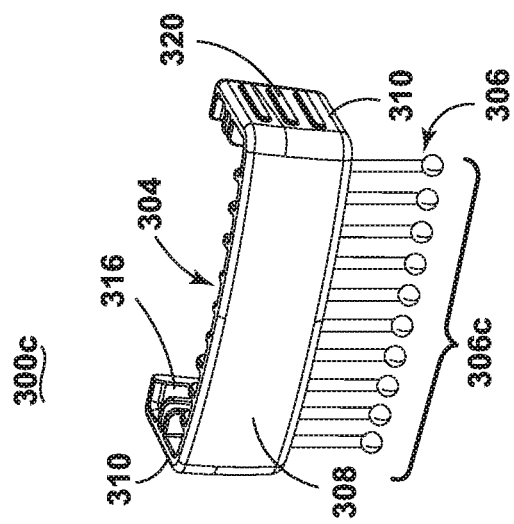
FIG. 24A is a front perspective view of a third embodiment of a grooming attachment for the hand tool.
Figure 23A:
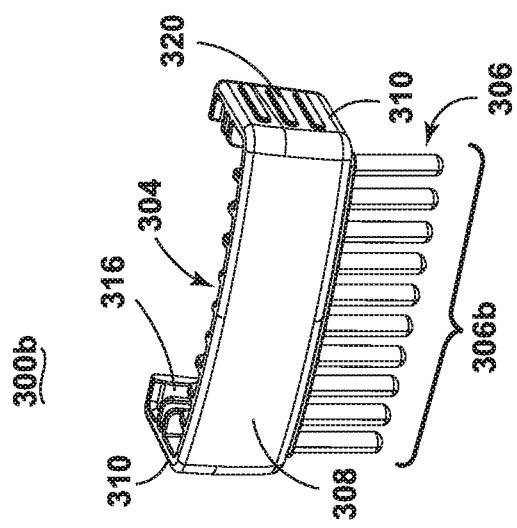
FIG. 23A is a front perspective view of a second embodiment of a grooming attachment for the hand tool.

The hand tool 12 includes a suction nozzle 264 is formed at a forward portion or a distal portion 266 of the body 250, and defines an inlet opening 268 to the recovery pathway 254. The inlet opening 268 can be narrow to generate high velocity airflow into the tool 12. The inlet opening 268 can further be provided as a single opening, or as multiple discrete and fluidly interconnected openings as shown in FIG. 21. The body 250 can optionally include a translucent or transparent nozzle cover 270 forming a portion of the recovery pathway for a user of view the interior of the suction nozzle 264 through the cover 270.

A rearward or proximal portion 272 of the hand tool 12 includes a conduit 274 with an outlet opening 276 in fluid communication with the suction nozzle 264. The conduit 274 is adapted to be coupled with the hose 16 to place the suction nozzle 264 in fluid communication with the module 14. When the tool 12 is coupled with the module 14, a working airflow can be drawn through the recovery pathway 254 of the tool 12 from the inlet opening 268 to the outlet opening 276.

The conduit 274 can form a handle for a user to hold or grip the tool 12 and can optionally have a grip portion 278 on an outer portion thereof formed with a textured or contoured surface so as to improve the ease with which a user can hold onto and manipulate the hand tool 12.

The hand tool 12 includes a fluid distributor 280 at the forward portion or distal portion 266 of the body 250, and defines an outlet opening from the delivery pathway 252. The fluid distributor 280 can directly distribute cleaning liquid to the pet or alternatively, as shown herein, a sprayer attachment 302 can be coupled with the hand tool 12 and the fluid distributor 280 can distribute cleaning liquid to the sprayer attachment 302 as explained in greater detail below. The fluid distributor 280 can optionally be arranged behind the suction nozzle 264 to distribute liquid rearwardly of the inlet opening 268, with reference to the forward and rearward portions 266, 272 of the tool 12.

A valve 284 controls the flow of cleaning liquid to the fluid outlet and is normally closed. A trigger 286 is operably coupled with the valve 284 to selectively open the valve 284. The trigger 286 can conveniently be located on or near the grip portion 278 of the tool 12 for single-handed operation of the tool 12.

Referring to FIG. 3, the trigger 286 and the valve 284 allow distribution of liquid from the fluid delivery system of the module 14 to be operated remotely from the module 14 and the hose 16. In operation, with the pump 30 of the module 14 energized, liquid is pumped through the hose 16 and tool 12 until it reaches the normally-closed valve 284. Squeezing the trigger 286 opens the valve 284 and allows liquid to flow through the valve 284 and be distributed by the tool 12.

Referring to FIG. 20, the valve 284 defines a fluid flow path extending from a valve inlet 288 to a valve outlet 290, with the fluid flow path being normally closed. The valve inlet 288 can be in fluid communication with the fluid delivery conduit 256 of the hose 16, such as by a first conduit or tubing 292 attached between the inlet 288 and the fluid delivery conduit 256. The valve outlet 290 can be in fluid communication with the fluid distributor 280, such as by a second conduit or tubing 294 attached between the outlet 290 and the fluid distributor 280. In one non-limiting example, the valve 284 can comprise a check valve.

As briefly discussed above, the pet grooming system 10 can include a plurality of grooming tools 300, 302 for connection to the hand tool 12. Referring to FIG. 21, a plurality of interchangeable grooming attachments 300 and a plurality of interchangeable sprayer attachments 302 can be provided. Each of the plurality of grooming attachments 300 interchangeably and removably mountable to the body 250 of the hand tool 12 at a first location on the forward portion of the body 250. Rach of the plurality of sprayer attachments 302 interchangeably and removably mountable to the body 250 of the hand tool 12 at a second location on the forward portion of the body 250. The hand tool 12 can mount one of the grooming attachments 300 on the distal portion 266 of the body 250, generally forwardly of the suction nozzle inlet opening 268, and can mount one of the sprayer attachments 302 over the fluid distributor 280 and generally rearwardly of the suction nozzle inlet opening 268, as described in further detail below. One grooming attachment 300 and one sprayer attachment 302 can be connected to the hand tool 12 at a time, e.g. the hand tool 12 is configured to concurrently mount one of sprayer attachments 302 and one of the grooming attachments 300. The remaining grooming and sprayer attachments 300, 302 can be stored in the grooming tool caddy 132 (FIGS. 5 and 11), stored elsewhere on the module 14 or stored separately from the module 14.

Figure 22A:
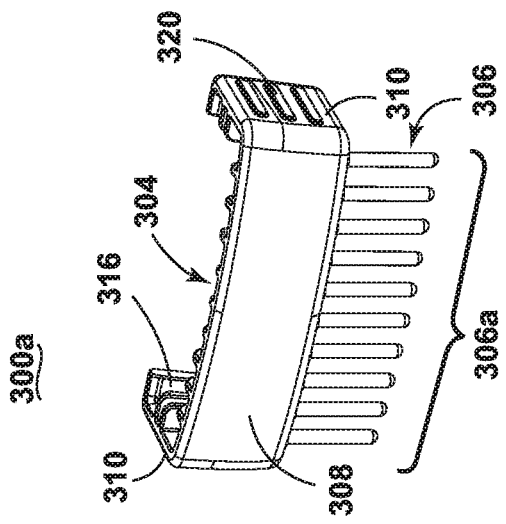
FIG. 22A is a front perspective view of a first embodiment of a grooming attachment for the hand tool.
Figure 22B:
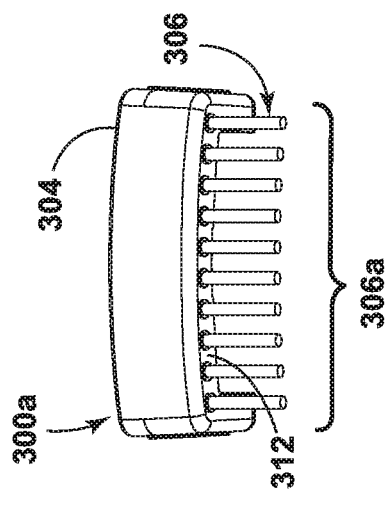
FIG. 22B is a front view of the grooming attachment from FIG. 22A.
Figure 23B:
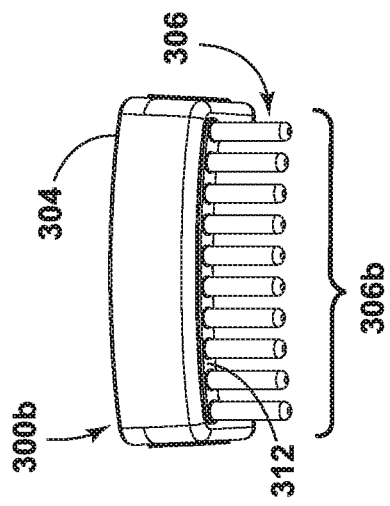
FIG. 23B is a front view of the grooming attachment from FIG. 23A.
Figure 24B:
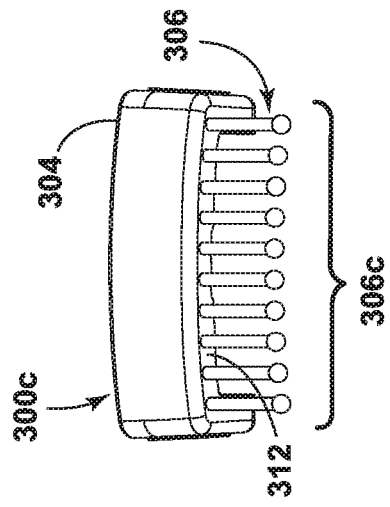
FIG. 24B is a front view of the grooming attachment from FIG. 24A.
Figure 22C:
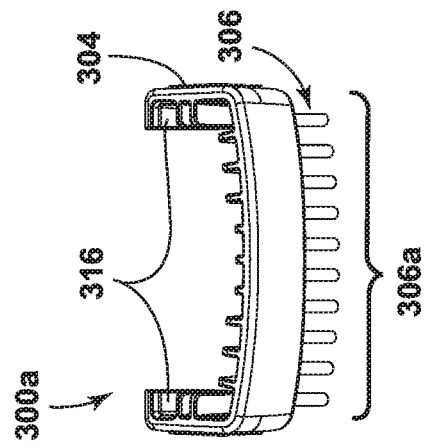
FIG. 22C is a top perspective view of the grooming attachment from FIG. 22A.
Figure 23C:
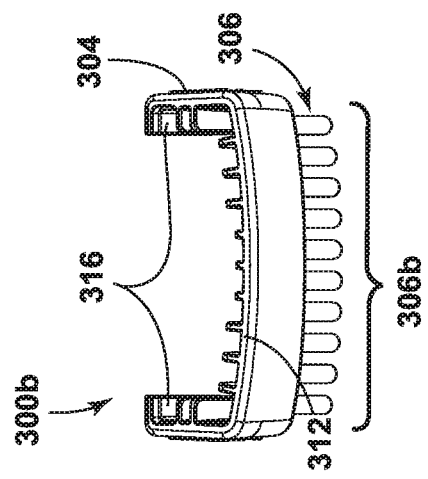
FIG. 23C is a top perspective view of the grooming attachment from FIG. 23A.
Figure 24C:
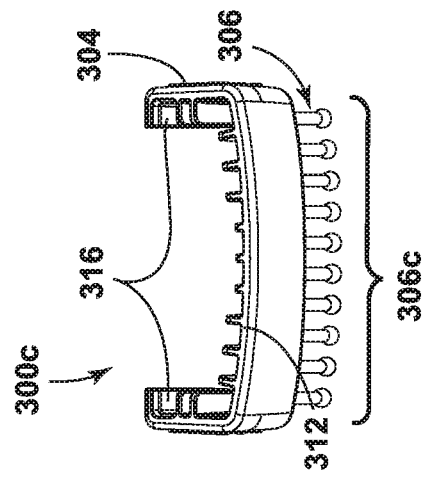
FIG. 24C is a top perspective view of the grooming attachment from FIG. 24A.

With additional reference to FIGS. 22A-22C, the grooming attachments 300 can comprise a grooming comb that can untangle and remove debris from the pet's coat. Each grooming attachment 300 includes a comb body 304 carrying a plurality of comb tines 306. The comb body 304 can be U-shaped, with a front wall 308 and two side walls 310 extending from the front wall 308. The comb tines 306 can extend from a lower edge 312 of the comb body 304, as shown herein, or from another portion of the comb body 304.

The comb tines 306 can project from at least the front wall 308, such as from the lower edge 312 of the front wall 308, in a single row of tines 306 as shown herein. Alternatively, multiple rows of tines 306 can be provided and/or the tines 306 can project from the side walls 310 in addition to the front wall 308. The front wall 308 can be straight or curved, as shown herein. With a curved front wall 308, the single row of tines 306 can also be arranged along a curve.

Referring additionally to FIG. 21, the hand tool 12 includes at least one projection, shown herein as rails 314, on which the grooming attachments 300 are mounted in a friction fit. The comb body 304 has slots 316 that are complementary to the rails 314 to permit the grooming attachment 300 to be slid onto the rails 314. As illustrated, the rails 314 can be provided on opposing sides 318 of the distal portion 266 of the tool body 250, though only one rail 314 is visible in FIG. 21. The slots 316 can be formed on inwardly-facing surfaces of the side walls 310. Other arrangements for mounting the grooming attachments 300 on the hand tool 12 are possible.

With reference to the example shown in FIG. 20, when the grooming tool 300 is installed on the hand tool 12, the front wall 308 confronts the nozzle cover 270 and the tines 306 are disposed forwardly or distally of the suction nozzle inlet opening 268. The tines 306 can further have free distal ends 319 that terminate below the suction nozzle inlet opening 268.

Referring to FIGS. 21-22A, to aid in installing or removing the grooming attachments 300, the comb body 304 can comprise a gripping surface 320. In the embodiment shown herein, the griping surface 320 comprises a plurality of ridges provided on an exterior of the comb body 304, such as on each of the side walls 310, to enhance the gripability of the comb body 304. The user can, for example, grip the grooming attachment 300 between a thumb and finger to slide the grooming attachment 300 on or off the rails 314 of the hand tool 12.

Referring to FIGS. 21-24C, the plurality of grooming attachments 300 shown herein includes a first grooming attachment 300a, a second grooming attachment 300b, and a third grooming attachment 300b. The grooming attachments 300a, 300b, 300c can be identical, or substantially identical, save for the tines 306. The material and/or shape of the tines 306 can differ between the various attachments. The comb body 304, particularly the slots 316, can be the same between the various attachments so that the attachments can be interchanged on the hand tool 12. Some non-limiting examples of materials for the tines 306 include metal, plastic, and rubber. Suitable metals include stainless steel, among others. Suitable plastics include injection-moldable polymers such as polyethylene, polypropylene, polycarbonate, polystyrene, styrene acrylonitrile resin (SAN), polyacetate, polyester, polyamide, polyolefin, polyvinylchloride, acrylonitrile-butadiene-styrene (ABS), nylon, or any combination thereof. Other suitable plastics include resilient elastomeric materials, including vinyl elastomers such as ethylene-vinyl acetate (EVA), and combinations thereof. Suitable rubbers include natural and synthetic elastomers, including natural rubber, polybutadiene polyurethane, thermoplastic elastomers (TPE), silicone rubber, nitrile rubber, ethylene propylene diene monomer (EPDM) rubber, thermoplastic vulcanizates (TPV) such as Santoprene™, or any combination thereof. The rubber or plastic tines 306 can further comprise a softening agent (i.e. a plasticizer).

Some non-limiting examples of shapes for the tines 306 include pin-shaped tines or ball-end tines. The pin-shaped tines are straight, with free ends that are not enlarged with respect to the rest of the tines. The ball-end tines have bulbous or ball-shaped free ends, which can help the tines 306 glide through the pet's coat more easily. In the embodiment shown in FIGS. 22a-24c, the first grooming attachment 300a has metal, pin-shaped tines 306a, the second grooming attachment 300b has rubber, pin-shaped tines 306b, and the third grooming attachment 300c has plastic, ball-end tines 306c.

The dimensions of the tines 306 can differ between the various attachments. Some non-limiting examples of the dimensions of the tines 306 that can be varied between the attachments include tine length and tine thickness. In the embodiment shown in FIGS. 22a-24c, the tine length is substantially the same for each grooming attachment 300, while the tine thickness varies. For example, the second grooming attachment 300b has thicker tines 306b than the first grooming attachment 300a or the third grooming attachment 300c.

Referring to FIGS. 25A-25C, the sprayer attachments 302 can each include a sprayer body or tool body 322 carrying one or more spray tips 324 and an agitator or brush 326. The body 322 is attachable to the body 250 of the hand tool 12, with the spray tips 324 in fluid communication with the fluid distributor 280. Thus, the spray tips 324 receive cleaning liquid via the distributor 280 and dispense cleaning liquid to the pet. In addition to dispensing cleaning liquid, the spray tips 324 divide and comb through a pet's coat to maximize cleaning performance by distributing cleaning liquid deep into the pet's coat, preferably at the base of the coat, and/or onto the pet's skin. The agitator or brush 326 works the dispensed cleaning liquid into the pet's coat. The spray tips 324 can also act as agitators to aid in working the dispensed cleaning liquid into the pet's coat to maximize cleaning performance.

The tool body 322 can include a front wall 327, a rear wall 328, and two side walls 330 joined with the front and rear walls 327, 328. The brush 326 can extend from a lower edge 332 of the tool body 322, as shown herein, or from another portion of the tool body 322. It is noted that while the brush 326 is shown as provided on the tool body 322, in other embodiments the brush 326 can be provided separately from the sprayer attachment 302, such as on the body 250 of the hand tool 12. It is also noted that other suitable agitating elements are possible, including but not limited to non-bristle agitators.

The brush 326 can include a plurality of bristles 334 extending from the rear and side walls 328, 330. The bristles 334 can be constructed from nylon or polyester, or any other suitable synthetic or natural fiber. The bristles 334 can be provided in a plurality of bristle tufts 338 in a single row, as shown herein. Alternatively, multiple rows of tufts 338 can be provided. In yet another alternative, the bristles 334 can be provided as at least one continuous strip of bristles.

The bristles 334 of the sprayer attachments 302 are more flexible than the tines 306 of the grooming attachments 300, such that the bristles 334 will bend and deflect more readily than the tines 306. The tines 306 may be stiffer in order to resist bending as the grooming attachment 300 combs through and detangles the pet's coat.

The sprayer attachment 302 includes a connector port 340 configured to couple with the fluid distributor 280 of the hand tool 12 (FIG. 28) for delivering cleaning fluid to the plurality of spray tips 324. A sealing member (not shown) can be provided between the fluid distributor 280 and the connector port 340 to prevent leaks at the interface between the hand tool 12 and sprayer attachment 302.

Referring to FIGS. 25B, 26B, and 27B, the spray tips 324 protrude from a lower surface 348 of the tool body 322, between the side walls 330. The lower surface 348 can extend rearwardly from the front wall 327 to join the rear wall 328. The individual spray tips 324 can be spaced apart and protrude downwardly from the tool body 322 like teeth or tines of a comb. In this way, the spray tips 324 can act to separate and comb through a pet's coat during grooming. The spray tips 324 can be made of any suitable rigid or semi-rigid material, including thermoplastic and thermosetting materials, elastomeric materials, stainless steel, or aluminum and alloys thereof. Still further, the spray tips 324 can be arranged in a single row as shown, or in multiple, staggered rows. Three spray tips 324 are included in the sprayer attachments 302. Other number of spray tips 324 are possible, including one spray tip, two spray tips, or more than three spray tips.

Referring to FIGS. 28-30, each spray tip 324 includes a hollow member defining a fluid passage 350 extending between an inlet 352 and an outlet 354. The spray tips 324 can be elongated and narrow for sliding through the pet's coat and delivering cleaning fluid deep into the pet's coat or onto pet's skin. The sprayer attachment 302 can include a manifold 342 having an inlet 344 for receiving cleaning liquid and multiple outlets 346 (only one of which is visible in FIGS. 28-30) for delivering the cleaning fluid to each spray tip 324. The manifold inlet 344 is in fluid communication with the connector port 340. The manifold outlets 346 can be defined by outlet openings aligned with one of the spray tips 324. Downstream of the manifold inlet 344, the manifold 342 branches into the multiple outlets 346 that each supply one of the spray tips 324. The spray tip inlets 352 are aligned with one of the manifold outlet 346 to receive cleaning liquid from the manifold 342. Alternatively, the spray tips 324 can be integrally formed with a portion of the manifold 342, and the manifold outlets can be formed by the inlets to the spray tips 324.

Referring to FIG. 21, the sprayer attachments 302 can be mounted in a friction fit on the same projections or rails 314 as the grooming attachments 300. The sprayer attachment 302 sits rearwardly or proximally of the grooming attachment 300 on the rails 314. The tool body 322 has slots 356 that are complementary to the rails 314 of the hand tool 12 to permit the sprayer attachment 302 to be slid onto the rails 314 to retain the attachment on the hand tool 12.

In one embodiment, the hand tool 12 has one or more latches for securing one or more of the pet grooming attachments 300, 302 on the hand tool 12. For example, the hand tool 12 can include at least one latch for securing one of the grooming tools 300 on the body 250 of the hand tool 12, at least one latch for securing one of the sprayer attachments 302 on the body 25 of the hand tool 12, or latches for both tools 300, 302.

Optionally, the sprayer attachments 302 are further latched to the hand tool 12. The hand tool 12 has flexible latch fingers 358 which engage latch projections 360 (FIGS. 25A-27A) on the tool body 322. The latch fingers 358 are flexible, and yield under application of sufficient force on the sprayer attachment 302 to disengage from the latch projections 360. A user can thereby easily interchange the sprayer attachments 302, without the need for tools or operating of locking mechanism, simply by pulling one sprayer attachment 302 off the hand tool 12 and inserting a different one. As illustrated, the slots 356 and latch projections 360 can be provided on inwardly-facing surfaces of the side walls 330. The latch fingers 358 have hooked ends that can snap into the latch projections 360. Other arrangements for mounting the sprayer attachments 302 on the hand tool 12 are possible.

To aid in installing or removing the sprayer attachments 302, the tool body 322 can comprise a gripping surface 364. In the embodiment shown herein, the griping surface 364 comprises an indentation provided on an exterior of the tool body 322, such as on each of the side walls 330, to enhance the gripability of the tool body 322. The user can, for example, grip the sprayer attachments 302 between a thumb and finger to slide the sprayer attachments 302 on or off the rails 314 of the hand tool 12.

With reference to the examples shown in FIGS. 28-30, when installed on the hand tool 12, the tool body 322 sits generally behind the suction nozzle 264 and the front wall 327 of the tool body 322 confronts a rear surface 362 of the suction nozzle 264. The connector port 340 is joined with fluid distributor 280, thereby placing the spray tips 324 in fluid communication with the delivery pathway of the hand tool 12. The spray tips 324 are disposed rearwardly or proximally of the suction nozzle inlet opening 268. The bristles 334 are disposed to the side or to the rear of the spray tips 324. Free ends of the bristles 334 can terminate at or above the spray tip outlets 354.

As shown in FIGS. 25A-27C, the plurality of sprayer attachments 302 includes a first sprayer attachment 302*a*, a second sprayer attachment 302*b*, and a third sprayer attachment 302*c*. The attachments can be identical, or substantially identical, save for the spray tips 324, which are referred to with reference numerals 324*a*, 324*b*, and 324*c*, accordingly. The dimensions, geometry, and/or shape of the spray tips 324 can differ between the various attachments. The tool body 322, particularly the slots 356 and latch projections 360, can be the same between the various attachments so that the attachments can be interchanged on the hand tool 12. The brush 326 can be the same or differ between the various attachments.

One non-limiting example of a dimension of the spray tips 324 that can be varied between the attachments is tip length. A longer spray tip is desirable when grooming a pet having a longer coat because longer spray tips are better able to penetrate the pet's coat and distribute cleaning liquid to the base of the coat and onto the pet's skin. Conversely, a shorter spray tip is desirable when grooming a pet having a shorter coat, because shorter spray tips are less likely to scratch the pet's skin, but still effectively distribute cleaning liquid to the base of the coat and skin. As shown in FIGS. 28-30, the second sprayer attachment 302*b* has the longest tip length, with the spray tips 324*b* protruding below the suction nozzle inlet opening 268. The first sprayer attachment 302*a* has the shortest tip length, with the spray tips 324*a* ending above the suction nozzle inlet opening 268.

Some non-limiting examples of geometries or shapes for the spray tips 324 include a cone-shaped tip that tapers toward the outlet 354 or a flat-ended tip that does not taper, or does not significantly taper, toward the outlet 354. Still other examples are round-ended tips or wedge-shaped tips, such as those disclosed in U.S. Patent Application Publication No. 2018/0110201, published Apr. 26, 2018, which is incorporated herein by reference in its entirety. In the embodiment shown in FIGS. 25*a*-27*b*, the first sprayer attachment 302*a* has flat-ended tips 324*a*, and the second and third sprayer attachments 302*b*, 302*c* have cone-shaped tips 324*b*, 324*c*.

Referring to FIGS. 25B and 26B, to increase the efficacy in combing through certain coat types or coat lengths, a parting ridge can be provided on one or more of the spray tips 324 for one or more of the sprayer attachments 302. In the embodiments of the sprayer attachments shown herein, parting ridges 366*a* are provided on the spray tips 324*a* of the first sprayer attachment 302*a* and parting ridges 366*b* are provided on the spray tips 324*b* of the second sprayer attachment 302*b*. The parting ridges 366*a*, 366*b* parts the pet's coat as the spray tips 324*a*, 324*b* comb through it, which places the spray tip outlets 354 closer to the base of the pet's coat and skin. Cleaning liquid is thereby distributed deep into the pet's coat, rather than on the surface of the coat. The parting ridges 366*a*, 366*b* can be made from the same material as the spray tips 324*a*, 324*b*, and can optionally be integrally molded therewith.

Referring additionally to FIGS. 28-29, each parting ridge 366*a*, 366*b* extends from one of the spray tips 324*a*, 324*b* to a narrow leading edge 368*a*, 368*b*, respectively. The narrow leading edge 368*a*, 368*b* can have thickness substantially less than a thickness of the spray tips 324*a*, 324*b*. The narrow leading edge 368*a*, 368*b* can be oriented facing the direction of movement on a cleaning stroke of the hand tool 12, e.g. where the hand tool 12 is drawn back through a pet's coat. In addition to being narrow, the leading edge 368*a*, 368*b* of the parting ridge 366*a*, 366*b* can taper toward the spray tip outlet 354 to reduce pulling on the pet's coat as the spray tips 324a, 324b comb through it, making the grooming experience more comfortable for the pet while still penetrating deep into the pet's coat.

The shape of the parting ridges 366a, 366b can differ between the various attachments 302a, 302b, and can be configured for optimized performance on different coat types. For example, the parting ridge 366b on the second sprayer attachment 302b has an angled leading edge 368b which, optionally in combination with the longer spray tips 324b, perform better for pets with longer coat types (e.g. Afghan Hound, Maltese, Shih Tzu, etc.) than the other attachments. The parting ridge 366b can be wedge-shaped, with the angled leading edge 368b converging toward the cone-shaped end of the spray tip 324b.

The parting ridge 366a on the first sprayer attachment 302a has a curved leading edge 368a configured to smoothly and comfortably glide on short pet coats (e.g. Beagle, Boxer, German Shorthair Pointer, etc.). The leading edge 368a can have an S-shape when view from the side, such as in FIG. 28. To further increase comfort and glidability, another ridge 370 can be provided on the trailing side of the spray tips 324a, and can generally be diametrically opposite the parting ridge 366a. The trailing ridge 370 can include a flat end portion 372 which extends forwardly from the outlet 354. The trailing ridges 370 can be made from the same material as the spray tips 324a and can optionally be integrally molded therewith.

The grooming attachments 300 and sprayer attachments 302 can be used in any combination, with certain combinations being optimal for specific pet coat types and lengths. For example, as shown in FIG. 28, the combination of the first sprayer attachment 302a with flat spray tips 324a can be combined with the first grooming attachment 300a having metal tines 306a may be most effective for grooming dogs with short, double coats (e.g. Lab, Golden Retriever, etc.). A combination of the first sprayer attachment 302a and the second grooming attachment 300b having rubber tines 306b may be most effective for grooming dogs with short, smooth coats (e.g. Beagle, Boxer, German Shorthair Pointer, etc.).

While a plurality of interchangeable attachments are shown, in other embodiments, the hand tool 12 can have one grooming attachment 300 and one sprayer attachment 302. In yet another embodiment, the comb tines 306, spray tips 324, and brushes 326 can be provided on the hand tool 12 and not provided on removable attachments.

Figure 31:
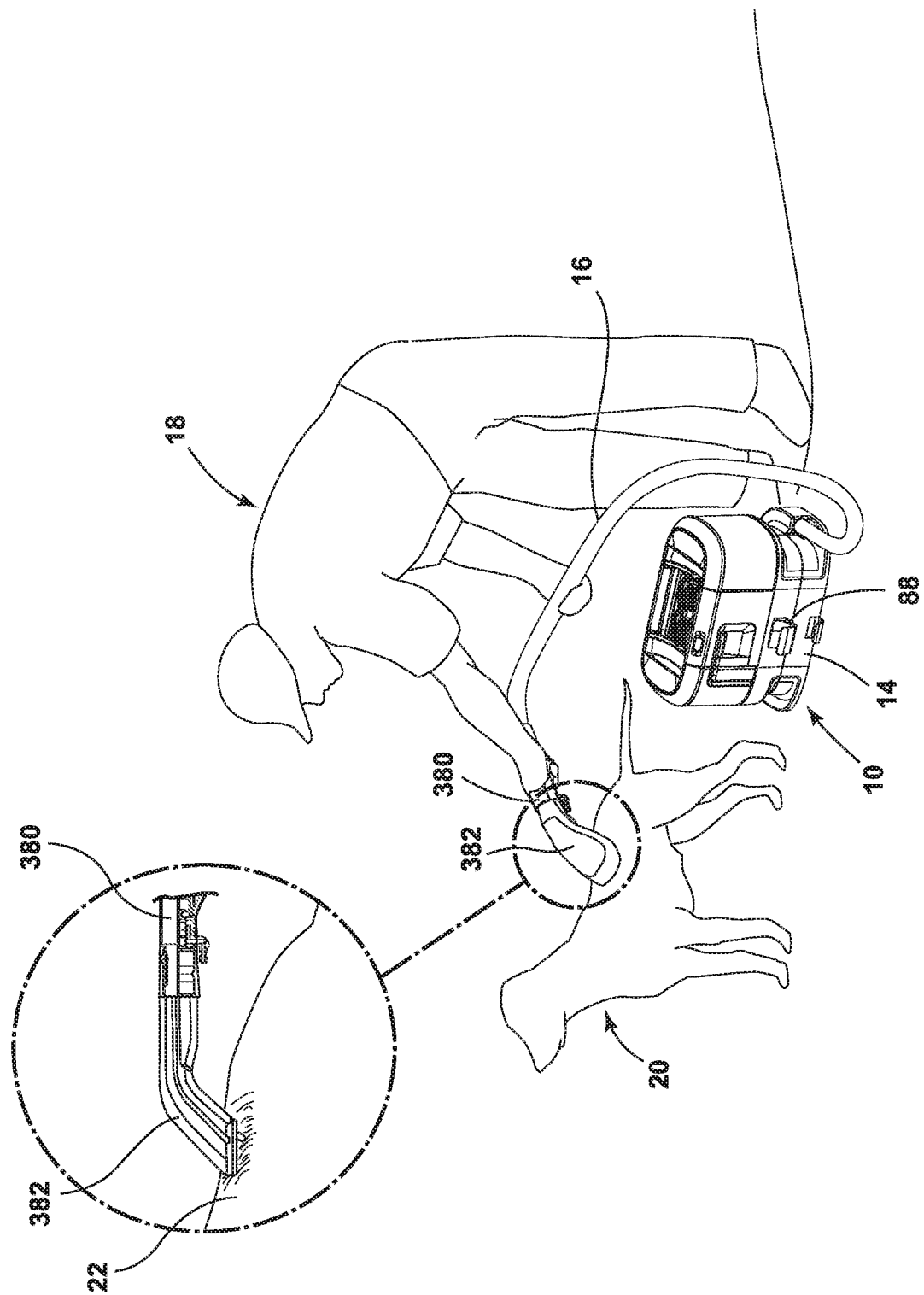
FIG. 31 is a schematic illustration of a pet grooming system according to another embodiment of the invention, the pet grooming system being used to groom a pet and including a portable module, a hand tool, a hose, and an adapter tool retrofitting the hand tool for use with the system.

With reference to FIG. 31, the pet grooming system 10 can further include an adapter tool 380 that can be installed on an end of the hose 16 to permit the use of a triggerless accessory tool 382, rather than the hand tool 12. While the hand tool 12 includes valve 284 and trigger 286 (see FIGS. 19-20), many pre-existing accessory tools, such as accessory tools for use with portable and upright deep cleaners, typically do not include a valve or a trigger, as control of fluid flow is performed elsewhere. The adapter tool 380 disclosed herein includes a trigger-operated valve mechanism which controls fluid flow. As such, the adapter tool 380 retrofits pre-existing accessory tools for use in the pet grooming system 10. The adapter tool 380 can optionally be stored on the tool mounting bracket 88 of the module 14, stored elsewhere on the module 14, or stored separately from the module 14.

Figure 32:
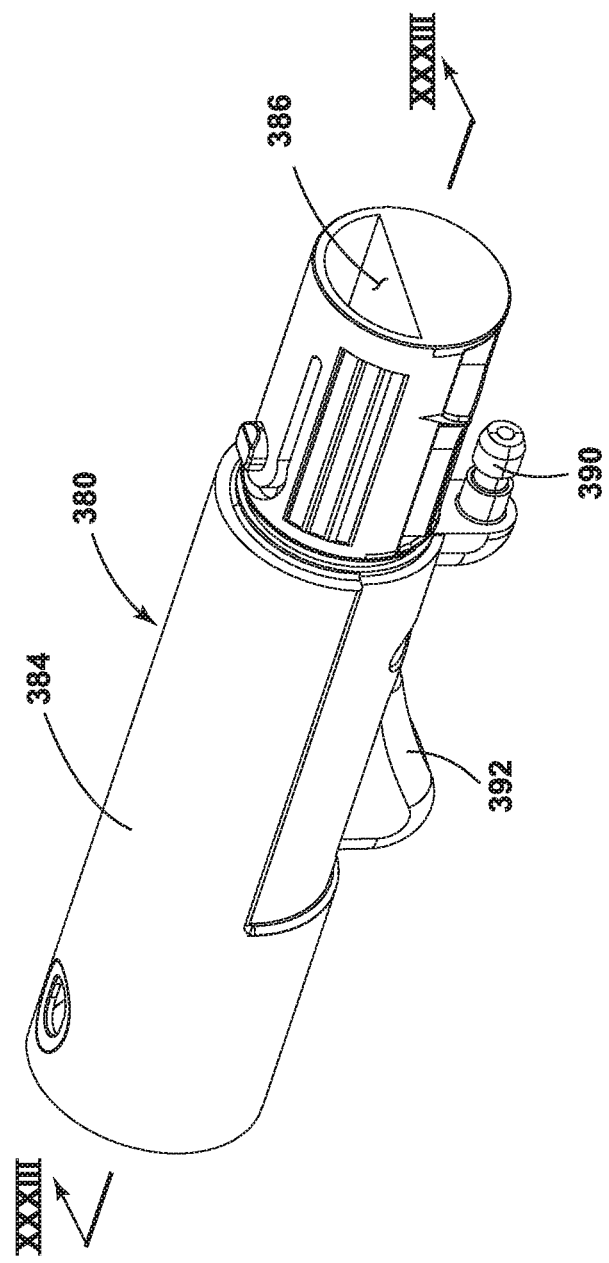
FIG. 32 is a front perspective view of the adapter tool from FIG. 31.

For purposes of description related to the adapter tool 380 shown in the figures, the terms "upper," "lower," "right," "left," "rear," "front," "vertical," "horizontal," and derivatives thereof shall relate to the adapter tool 380 as oriented in FIG. 32 from the perspective of a user holding the adapter tool 380 in a normal operating position (see FIG. 31). However, it is to be understood that embodiments of the disclosure may assume various alternative orientations, except where expressly specified to the contrary.

Figure 33:
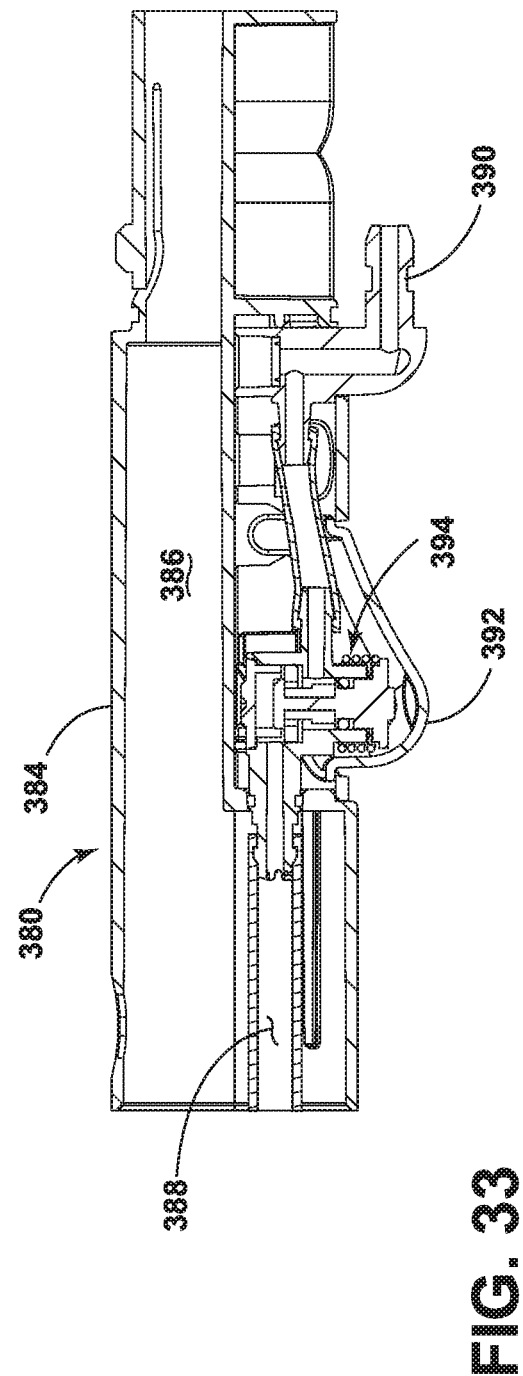
FIG. 33 is a cross-sectional view of the adapter tool taken through line XXXIII-XXXIII of FIG. 32.

Referring to FIGS. 32-33, the adapter tool 380 includes a housing 384, illustrated herein as having the shape of a tube or wand that defines a suction conduit 386. The suction conduit 386 configured to define a portion of a recovery pathway of the system 10. The adapter tool 380 also includes a delivery conduit 388 configured to define a portion of a fluid delivery pathway of the tool 380, which can include a fluid delivery nozzle 390 at the outlet end thereof. When the adapter tool 380 is coupled with the hose 16 (see FIG. 20), the adapter delivery conduit 388 is fluidly coupled with the hose delivery conduit 256 and the adapter suction conduit 386 is fluidly coupled with the hose suction conduit 258.

The adapter tool 380 includes a trigger 392 that controls fluid flow through the delivery nozzle 390 by operating a valve 394 in the delivery conduit 388. The valve 394 can be identical or similar to the valve 284 disclosed above with reference to FIG. 20.

Figure 34:
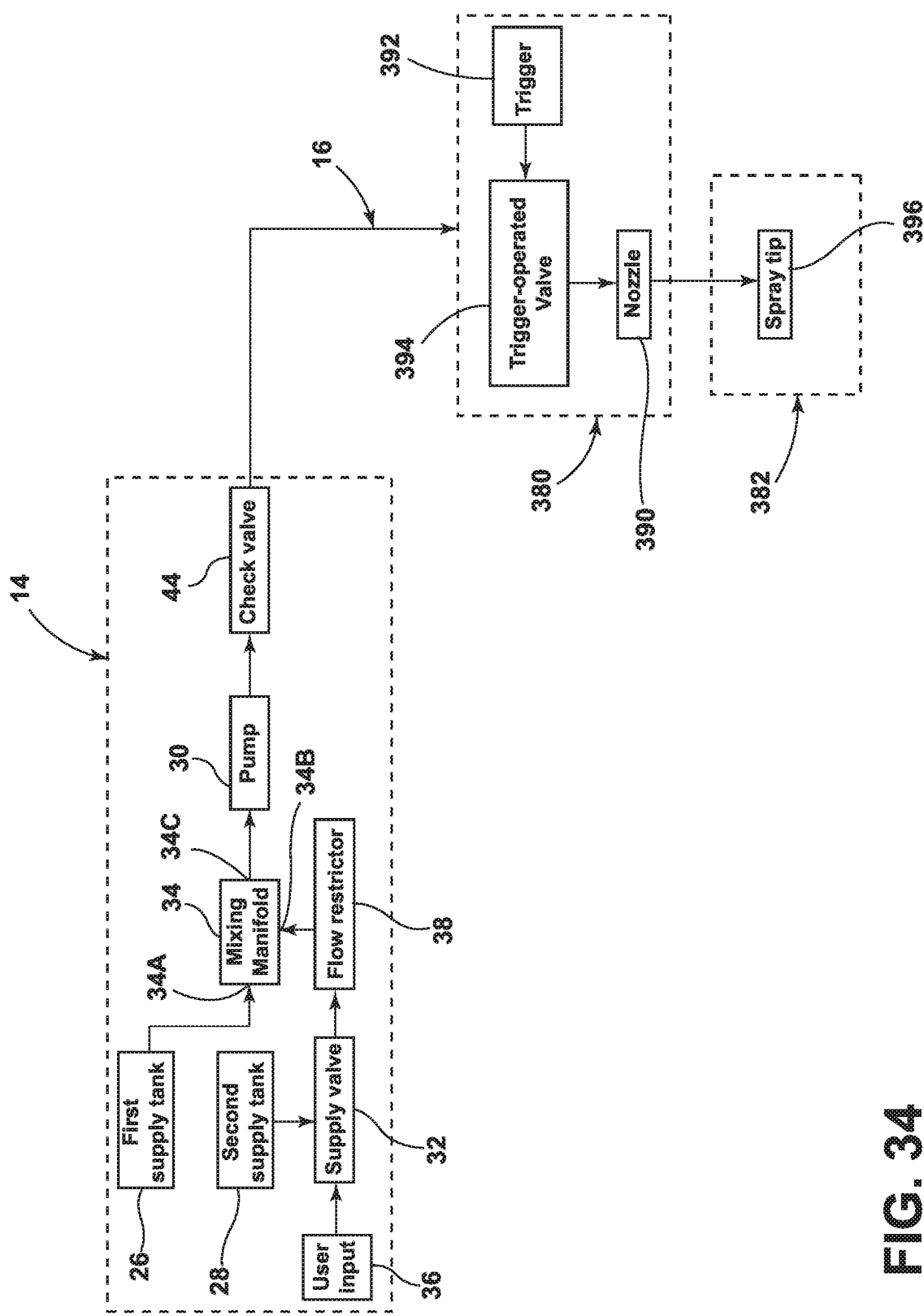
FIG. 34 is a schematic view of a fluid delivery system for the pet grooming system of FIG. 31.

With additional reference to FIG. 34, when the triggerless accessory tool 382 is coupled with the adapter tool 380, the adapter delivery conduit 388 is fluidly coupled with the tool delivery pathway and the adapter suction conduit 386 is fluidly coupled with the tool recovery pathway. Control of fluid dispensing from one or more spray tips 396 of the triggerless accessory tool 382 is performed at the adapter tool 380. By selectively depressing the trigger 392, the valve 394 opens and the user can dispense cleaning liquid from the accessory tool 382.

The various components of the pet grooming system 10 disclosed herein can be provided in various combinations and/or kits. For example, in one embodiment, the hand tool 12, portable module 14, hose 16, and attachments 300, 302 can be packaged and sold as a pet grooming kit. The pet grooming kit can further include written instructions for assembling and/or operating the system 10 and/or a container of cleaning solution for the supply tank. In another embodiment, the pet grooming kit can include the adapter tool 380. In this case, the pet grooming kit can exclude the hand tool 12, and can optionally also exclude the attachments 300, 302, since the adapter tool 380 can be used to make the module 14 compatible with various accessory tools already on the market, including both portable and full size extraction cleaning machines.

In yet another embodiment, the hand tool 12 and attachments 300, 302 disclosed herein can be used with various portable and full-size extraction cleaning machines already on the market instead of the module 14 shown. Examples of a suitable surface cleaning apparatus are set forth in detail in U.S. Pat. No. 7,073,226, incorporated above, and U.S. Pat. No. 9,615,703, issued Apr. 11, 2017, and U.S. Pat. No. 6,167,586, issued Jan. 2, 2001, both of which are also incorporated herein by reference in their entirety. A wand override unit, such as disclosed in U.S. Patent Application Publication No. 2018/0110201, incorporated above, can additionally be used in conjunction with the surface cleaning apparatus to override the normal liquid distribution control of the surface cleaning apparatus so that liquid distribution can be controlled at the hand tool 12.

To the extent not already described, the different features and structures of the various embodiments of the invention, may be used in combination with each other as desired, or may be used separately. Although one surface cleaning apparatus is illustrated herein as having all of these features, this does not mean that all of these features must be used in combination, but rather was done so here for brevity of description. Thus, the various features of the different embodiments may be mixed and matched in various cleaning apparatus configurations as desired to form new embodiments, whether or not the new embodiments are expressly described.

The above description relates to general and specific embodiments of the disclosure. However, various alterations and changes can be made without departing from the spirit and broader aspects of the disclosure as defined in the appended claims, which are to be interpreted in accordance with the principles of patent law including the doctrine of equivalents. As such, this disclosure is presented for illustrative purposes and should not be interpreted as an exhaustive description of all embodiments of the disclosure or to limit the scope of the claims to the specific elements illustrated or described in connection with these embodiments. Any reference to elements in the singular, for example, using the articles "a," "an," "the," or "said," is not to be construed as limiting the element to the singular.

Likewise, it is also to be understood that the appended claims are not limited to express and particular compounds, compositions, or methods described in the detailed description, which may vary between particular embodiments that fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

The invention claimed is:

1. A pet grooming system, comprising:
a portable module including a housing, a delivery system configured to store and deliver cleaning liquid, and a recovery system configured to remove and collect spent cleaning liquid and debris;
a conduit assembly comprising a delivery conduit in fluid communication with the delivery system and a suction conduit in fluid communication with the recovery system;
a hand tool coupleable with the portable module via the conduit assembly, the hand tool comprising:
 a body that is hand-holdable by a user;
 a delivery pathway extending through the body and coupleable with the delivery system of the portable module via the delivery conduit of the conduit assembly;
 a recovery pathway extending through the body and coupleable with the recovery system of the portable module via the suction conduit of the conduit assembly;
 a fluid distributor at a forward portion of the body and defining an outlet opening for the delivery pathway; and
 a suction nozzle at the forward portion of the body and defining an inlet opening for the recovery pathway;
a plurality of pet grooming attachments comprising:
 a plurality of grooming combs, each of the plurality of grooming combs interchangeably and removably mountable to the body of the hand tool at a first location on the forward portion of the body;
 a plurality of sprayer attachments, each of the plurality of sprayer attachments interchangeably and removably mountable to the body of the hand tool at a second location on the forward portion of the body; and
wherein the hand tool is configured to concurrently mount one of the plurality of grooming combs and one of the plurality of sprayer attachments.

2. The pet grooming system of claim 1, wherein the plurality of grooming combs each comprising a comb body carrying a plurality of tines, the comb body attachable to the body of the hand tool with the plurality of tines disposed forwardly of the fluid distributor and the suction nozzle.

3. The pet grooming system of claim 2, wherein a first one of the plurality of grooming combs comprises polymer tines and a second one of the plurality of grooming combs comprises metal tines.

4. The pet grooming system of claim 2, wherein the tines of a first one of the plurality of grooming combs comprise pin-shaped tines and the tines of a second one of the plurality of grooming combs comprise ball-end tines.

5. The pet grooming system of claim 2, wherein:
the tines of a first one of the plurality of grooming combs comprise a first tine length and a first tine thickness;
the tines of a second one of the plurality of grooming combs comprise a second tine length and a second tine thickness; and
the second tine thickness is greater than the first tine thickness.

6. The pet grooming system of claim 1, wherein the plurality of sprayer attachments each comprise a sprayer body carrying a plurality of spray tips, the sprayer body attachable to the body of the hand tool with the plurality of spray tips in fluid communication with the fluid distributor.

7. The pet grooming system of claim 6, wherein the plurality of sprayer attachments each comprise a brush on the sprayer body, the brush comprising a plurality of bristles.

8. The pet grooming system of claim 6, wherein:
the spray tips of a first one of the plurality of sprayer attachments comprise a first spray tip length;
the spray tips of a second one of the plurality of sprayer attachments comprise a second spray tip length; and
the second spray tip length is greater than the first spray tip length.

9. The pet grooming system of claim 6, wherein the spray tips of a first one of the plurality of sprayer attachments comprise flat-ended tips and the spray tips of a second one of the plurality of sprayer attachments comprise cone-shaped tips.

10. The pet grooming system of claim 6, wherein at least one of the plurality of sprayer attachments comprises at least one parting ridge provided on one of the spray tips.

11. The pet grooming system of claim 10, wherein the at least one parting ridge extends from a respective one of the spray tips to a narrow leading edge.

12. The pet grooming system of claim 10, wherein at least one of the plurality of sprayer attachments comprises a trailing ridge provided on one of the spray tips, the parting ridge extending from a first, leading side of the spray tip and the trailing ridge extending from a second, trailing side of the spray tip, and wherein the trailing ridge is diametrically opposite the parting ridge.

13. The pet grooming system of claim 6, wherein the plurality of sprayer attachments each comprise:
a connector port configured to couple with the fluid distributor of the hand tool; and a manifold having an inlet in fluid communication with the connector port and multiple outlets, each outlet supplying cleaning liquid to one of the plurality of spray tips.

14. The pet grooming system of claim 1, wherein:
the hand tool comprises a pair of opposing rails at the forward portion of the body;
each of the plurality of pet grooming attachments comprises slots for receiving rails;
the hand tool is configured to concurrently mount one of the plurality of sprayer attachments and one of the plurality of grooming combs on the rails, with the one of the plurality of sprayer attachments sitting rearwardly of the one the plurality of grooming combs on the rails; and
the hand tool comprises a latch for latching one of the pet grooming attachments on the hand tool.

15. The pet grooming system of claim 1, comprising:
a grooming tool caddy in which the plurality of pet grooming attachments are storable; and
a caddy recess at an upper portion of the portable module, the caddy recess configured to removably receive the grooming tool caddy.

16. The pet grooming system of claim 1, wherein the portable module comprises:
a carry handle at an upper portion thereof; and
a handle recess in which the carry handle is stowable;
wherein the carry handle pivotally coupled to the housing and is moveable between a stowed position in which the carry handle is stowed in the handle recess and a carry position in which the carry handle is pivoted out of the handle recess; and
wherein the handle recess has a depth substantially equal to or greater than a thickness of the carry handle such that in the stowed position the carry handle does not extend beyond the handle recess and is substantially flush with the upper portion of the portable module.

17. The pet grooming system of claim 1, wherein the delivery system comprises:
a first supply tank;
a second supply tank;
a first pathway between the first supply tank and an inlet to the delivery conduit; and
a supply valve controlling a flow of liquid from the second supply tank to the first pathway; and
a user-engageable control lever coupled to the supply valve and including a user-input end accessible from an exterior of the housing, wherein the control lever is configured to open the supply valve to permit flow of the liquid from the second supply tank to the first pathway, and to close the supply valve to prevent flow of liquid from the second supply tank to the first pathway.

18. The pet grooming system of claim 17, wherein the delivery system comprises:
a pump in the first pathway; and
a mixing manifold in the first pathway, fluidly upstream of the pump, that selectively receives cleaning liquid from the first supply tank and the second supply tank;
wherein a second pathway fluidly connects an outlet of the supply valve with the mixing manifold.

19. The pet grooming system of claim 17, wherein the second supply tank is nested with the first supply tank.

20. The pet grooming system of claim 1, wherein the recovery system comprises:
a recovery pathway having an air inlet and an air outlet, the air outlet comprising exhaust vents in the housing;
a recovery tank for receiving recovered liquid and debris for later disposal, wherein the suction conduit is in fluid communication with an inlet of the recovery tank;
a suction source in fluid communication with the air inlet and the recovery tank for generating a working air stream through the recovery pathway, wherein the suction source comprises a vacuum motor, a working air fan operably coupled with the vacuum motor and configured to draw working air through the recovery pathway, and a cooling air fan operably coupled with the vacuum motor and configured to draw motor cooling air through a motor-cooling pathway;
a cooling air inlet for the motor-cooling pathway formed in the housing;
a cooling air outlet for the motor-cooling pathway formed in the housing; and
an enclosure for the suction source having cooling air intake openings formed in a portion of the enclosure;
wherein at least one of the exhaust vents, the cooling air inlet, and the cooling air outlet is disposed on a side of the enclosure lacking cooling air intake openings.

* * * * *